(12) United States Patent
Stenard

(10) Patent No.: US 7,926,769 B2
(45) Date of Patent: Apr. 19, 2011

(54) SHOCK-LIMITING INTERFACE, COMPACT (SLIC)

(76) Inventor: John Stenard, St. Petersburg, FL (US)

( * ) Notice: Subject to any disclaimer, the term of this patent is extended or adjusted under 35 U.S.C. 154(b) by 0 days.

(21) Appl. No.: 11/338,299

(22) Filed: Jan. 24, 2006

(65) Prior Publication Data

US 2007/0034768 A1   Feb. 15, 2007

Related U.S. Application Data

(63) Continuation of application No. 10/330,370, filed on Dec. 27, 2002, now Pat. No. 7,070,153.

(60) Provisional application No. 60/345,275, filed on Jan. 2, 2002, provisional application No. 60/402,522, filed on Aug. 9, 2002.

(51) Int. Cl.
*A47C 1/00* (2006.01)

(52) U.S. Cl. ..... 248/157; 248/581; 248/613; 297/344.15

(58) Field of Classification Search .................. 248/638, 248/157, 618, 424, 371, 542; 297/345, 344.15, 297/217.1
See application file for complete search history.

(56) References Cited

U.S. PATENT DOCUMENTS

| | | |
|---|---|---|
| 875,759 A | 1/1908 | Whitcomb |
| 1,153,531 A | 9/1915 | Adams |
| 1,260,019 A | 3/1918 | Oliver |
| 1,713,914 A | 5/1929 | O'Connor |
| 2,139,666 A | 12/1938 | Bogart |
| 2,237,618 A | 4/1941 | Snyder |
| 2,426,641 A | 9/1947 | Pitre |
| 2,429,140 A * | 10/1947 | Snyder .......... 267/209 |
| 2,481,006 A | 9/1949 | Dath |
| 2,507,760 A | 5/1950 | Dath |
| 2,574,788 A | 11/1951 | Janeway |
| 2,639,044 A | 5/1953 | Mulcahy |
| 2,646,860 A | 7/1953 | Pirard |
| 2,703,156 A | 3/1955 | Depallens |
| 2,752,149 A | 6/1956 | Forcellini |
| 2,753,177 A | 7/1956 | Boyd |
| 3,054,478 A | 9/1962 | Rumsey |
| 3,866,724 A | 2/1975 | Hollnagel |

(Continued)

OTHER PUBLICATIONS

Gezari, Walter A. PhD., "Special Mission Seating 800v5.3, Hi-Performance 800v5.3 Commercial", pp. 18-19, http://www.stidd.com/OnlineCatalog/catalog.htm.

(Continued)

*Primary Examiner* — Terrell Mckinnon
*Assistant Examiner* — Steven M Marsh

(57) ABSTRACT

A passive/reactive device protests a Payload from injury or damage due to the shock caused by impact or explosion. When the vehicle or structure mounting the Payload receives a shock pulse, the invention limits the acceleration transmitted from the vehicle or structure to the Payload to an acceptably low, user-adjustable level which is substantially constant or is some other user-adjustable force-displacement function. The invention is capable of doing so even when the peak magnitude of the imposed shock is on the order of thousands of G's, with a rise time to peak on the order of microseconds. The invention can be embodied to operate passively, without any external source of power, sensor system, or CPU, although they can be added to improve certain usability features. The invention also absorbs or dissipates the shock energy in substantially the minimum distance possible without exceeding the user-defined acceleration limit on the Payload. The invention can also react when a shock-producing impact is imminent by repositioning the Payload away from the impact site.

20 Claims, 17 Drawing Sheets

U.S. PATENT DOCUMENTS

| | | | |
|---|---|---|---|
| 3,870,128 A | 3/1975 | Nicolay | |
| 3,951,238 A | 4/1976 | Dent | |
| 3,990,542 A | 11/1976 | Dent | |
| 4,010,940 A | 3/1977 | Freyler | |
| 4,029,283 A * | 6/1977 | Swenson et al. | 248/567 |
| 4,161,238 A | 7/1979 | Lasoen | |
| 4,243,195 A | 1/1981 | Rosenberg | |
| 4,333,621 A | 6/1982 | Acker | |
| 4,351,556 A | 9/1982 | Worringer | |
| 4,360,171 A | 11/1982 | Reid | |
| 4,425,863 A | 1/1984 | Cutler | |
| 4,533,109 A * | 8/1985 | Delam | 248/542 |
| 4,583,621 A | 4/1986 | Tangorra | |
| 4,606,442 A | 8/1986 | Paton | |
| 4,726,161 A | 2/1988 | Yaghoubian | |
| 4,738,437 A | 4/1988 | Paton | |
| 4,886,255 A | 12/1989 | Paton | |
| 4,915,031 A | 4/1990 | Wiebe | |
| 4,955,467 A | 9/1990 | Kallenbach | |
| 5,099,963 A | 3/1992 | Alchin | |
| 5,133,435 A | 7/1992 | Taylor | |
| 5,169,112 A * | 12/1992 | Boyles et al. | 248/550 |
| 5,183,137 A | 2/1993 | Siwek | |
| 5,367,978 A | 11/1994 | Mardikian | |
| 5,535,861 A | 7/1996 | Young | |
| 5,613,570 A | 3/1997 | Becker | |
| 5,639,059 A | 6/1997 | Nash | |
| 5,645,142 A | 7/1997 | Kraemer | |
| 5,655,632 A | 8/1997 | Valembois | |
| 5,732,370 A * | 3/1998 | Boyle et al. | 701/37 |
| 5,765,803 A * | 6/1998 | Graham | 248/624 |
| 5,810,125 A | 9/1998 | Gezari | |
| 5,895,090 A * | 4/1999 | Farquhar et al. | 297/216.1 |
| 5,911,191 A | 6/1999 | Burer | |
| 5,970,898 A | 10/1999 | Pereira | |
| 6,042,093 A | 3/2000 | Garelick | |
| 6,082,506 A | 7/2000 | Huang | |
| 6,247,687 B1 | 6/2001 | Jensen | |
| 6,354,406 B1 | 3/2002 | Ring et al. | |
| 6,550,740 B1 | 4/2003 | Burer | |
| 6,578,813 B1 | 6/2003 | Monson et al. | |
| 6,612,408 B2 | 9/2003 | Serkh | |
| 6,644,737 B2 * | 11/2003 | Kohl et al. | 297/217.1 |
| 6,679,185 B2 | 1/2004 | Sullivan | |
| 6,719,258 B2 * | 4/2004 | Bryngelson et al. | 248/419 |

OTHER PUBLICATIONS

Gezari, Walter A. PhD., "Model 800v.5 Advanced Shock-Mitigating Seat/Bolster", http://www.stidd.com/pdf/800v5promosheet.pdf.

Taylor Devices, "Taylor Devices Self Adjusting Shock Absorbers", http://www.taylordevices.com/5absorb.htm.

Parker Hannifin Corp., "Linear Decelerators", Parker Catalog AU08-1022/NA, Jan. 2003, pp. 4-7.

Chuck Paine & Associates., "Ribcraft Mitigator", http://www.chuckpaine.com/zribcraft.html.

Peterson Ronald PhD., "Shock Mitigation for High Speed Planning Boats", Doc # N0001401WX20030, Naval CSS, Panama City FL, (undated, circa 2002).

Townes, Brookes, "Mitigating Impacts", Professional Boatbuilder, Apr./May 2001.

Eaglecraft Aluminum Boats, "Wave-Rider Pedestals", http:/www.eaglecraft.bc.ca/pro.sub.--pedastal.html.

Seaspension, "Seaspension Solo Post", http://www.seaspension.com/solo.sub.--posts.htm.

Buzzi, Fabio, "Accessories: Tecno Seats", http://fbdesign.it/seats.php.

* cited by examiner

Figure 1. Block diagram of the invention, a generic SLIC device.

SHOCK-LIMITING INTERFACE, COMPACT (SLIC)

The present application is a continuation of prior application Ser. No. 10/330,370, filed on Dec. 27, 2002, now U.S. Pat. No. 7,070,153 B1, and claims the priority thereof and of Provisional Patent Application 60/345,275 filed Jan. 2, 2002, and Provisional Patent Application 60/402,522 filed Aug. 9, 2002, the disclosures of which are incorporated herein by reference in their entireties.

The present invention is a new concept in protecting a Payload from injury or damage due to the shock of impact experienced by the Payload's vehicle (or structure). The present invention is installed as an interface between the Payload and vehicle; and limits the force transmitted to the Payload while absorbing the energy of the shock pulse. The invention can be embodied in many ways, including as a seating system, a passenger platform, an equipment mounting system, a crash protection capsule, a blast-proof chamber, or a thrill ride.

The invention is unusually adept at protecting against shock. Unlike other shock-absorbing approaches which reduce the transmitted shock to a percentage of the excitation shock, this invention unequivocally limits the force transmitted from the vehicle (or structure) to the Payload to a low, user-adjustable value. It does this virtually independently of the magnitude of the impact acceleration or jerk ($d^3x/dt^3$). In addition, the invention accomplishes this using the minimum possible relative displacement between Payload and vehicle, consistent with not exceeding the limit on acceleration transmitted to the Payload.

BACKGROUND OF THE INVENTION

Planing boats operating in rough water may experience significant vertical shocks when the boat and wave impact one another. The most powerful shocks occur after a boat has become airborne flying off the crest of a wave, when the boat lands onto a wave face with its keel substantially parallel to the wave surface. Shock impulses on the order of 50 Gs with pulse durations in excess of 40 milliseconds are not uncommon, and such shock is more than enough to cause serious injury. Documented injuries include sprains to the back neck, hip, knee, and shoulder, kidney damage, and broken ribs and limbs.

Typically, naval architects have attempted to reduce this shock by deepening and narrowing the hull, and pointing the bow. These deep-vee hulls impact the water more gradually and with less peak acceleration than shallower, flatter hulls. But deep-vee hulls require deeper water for safe navigation, may have roll stability issues, and generally require more fuel for a given speed than shallow-vee hulls. Moreover, they cannot unquestionably limit the acceleration on the Payload in all cases of boat-water impact.

Boat operators typically attempt to reduce shock by either slowing down considerably in rough water, or slowing down somewhat while attempting to steer and throttle around the biggest waves while avoiding becoming airborne. The drawback of these approaches is the speed reduction. Military and law-enforcement boats often cannot slow too much without risking mission failure. Offshore power boats cannot slow too much without risking the race.

A number of hardware devices have been developed and are in use, including several that have been patented. All have drawbacks. Perhaps the most serious drawback of previous approaches is that they cannot protect the Payload if the incident shock peak or its rate of rise is too large. Many of these devices work reasonably well provided the peak shock amplitude is fairly low, for example, shock peak under 10 G's with jerk under 100 G's per second. But the performance of these same devices degrades as the rate of rise and/or peak amplitude of the acceleration increases. Faster boat speeds and rougher seas create sharper, more powerful shocks, with peaks on the order of 50 G's and jerk on the order of 1,000 G's per second. Previous approaches are generally based on viscous dampers and springs. A viscous damper's force is a function of the relative velocity of its endpoints. Even if actively controlled, a viscous damper transmits forces to the Payload which depend on the peak load and loading rate of the shock pulse.

A problem related to protection from boat shock is protection from explosive shock. Explosive devices generate accelerations on the order of thousands of G's with jerk on the order of tens of millions of G's per second. Explosions have such short pulse durations, as small as a fraction of a millisecond, that an active protection system would require an extremely high sampling rate, some very rapid processing algorithms to discriminate between noise and an actual explosion, and very rapid actuators to effect protection of the Payload, making an active protection system very expensive, if it could be made at all. Current approaches using passive viscous damping systems would either break or dump fluid out their relief valve under such extreme forces. Traditional approaches to protecting against shock differ somewhat depending upon the nature of the Payload. If the Payload consists of equipment, the traditional approaches have been to either harden it or mount it on resilient mounts. Hardening generally results in increased weight and volume, and often impacts accessibility for maintenance and convective cooling. Resilient mounting often exacts volume penalty in order to accommodate sway and surge of the equipment during shock. In cases where the Payload is personnel, there have also been two similar traditional approaches. The first is to brace for shock, generally involving bending the legs and holding onto handrails while tensing the muscles. The other approach has been some type of resilient interface such as padded seating or heavy sponge rubber deck covering on a ship traversing a suspected minefield. No systematic, engineered approach which can unequivocally protect a Payload from explosive shock has been developed.

Another drawback of many previous approaches is an inability to adjust to the weights of various Payloads. These devices are either overly stiff or overly soft depending upon the Payload mass. Overly stiff devices obviously transmit too much force to the Payload. But overly soft devices may also be inadequate in that they expend all available relative displacement between Payload and vehicle without absorbing all the shock energy. The Payload then bottoms out, spiking the acceleration. Even if the Payload does not bottom out, an overly soft interface takes up more volume than required, impacting its usefulness, particularly in high-performance vehicles.

A further drawback of previous devices is a slow reset time. If the device cannot restore the Payload to its original position before the next shock hits, then the next shock may cause it to bottom out.

The purpose of the present invention is to protect the Payload (personnel and sensitive equipment) from shock. It does so by limiting the force transmitted to the Payload to a low, user-adjustable value, regardless of the peak amplitude or rise rate of the imposed shock on the vehicle or structure.

Another purpose of the present invention is to provide adjustment of the force transmitted to the Payload from the vehicle or structure to accommodate masses of various Payloads without being overly stiff or bottoming out.

Another purpose of the present invention is to have a quick reset time so that it can be fully recovered in time for each subsequent shock events.

BRIEF DESCRIPTION OF THE INVENTION

In accordance with the foregoing purposes and other purposes and intents, the invention is based upon three required principles and one optional principle.

The first principle is limiting the acceleration upon the Payload regardless of the peak shock imposed upon the vehicle.

The second principle is that the displacement required to dissipate the shock energy be minimized.

The third principle is adjustability to accommodate a range of Payload masses.

The fourth principle is optional and is the ability to react to an impending shock by repositioning the Payload to gain more displacement over which to dissipate the shock energy.

A number of useful ways to implement the above principles are conceived. Various seating systems, equipment foundations, cockpit enclosures, platforms, and even entire chambers can be isolated from their surroundings by the present invention.

The invention is generically comprised of four required assemblies, plus one optional assembly.

(1) The Frame Assembly (FA) mounts directly to the vehicle. It provides structural support to the other major assemblies, constraining their movement to within acceptable-limits, and enabling them to function properly.

(2) The Payload Interface Assembly (PIA) directly interfaces with the Payload. It directly supports and restrains the Payload. It provides monitoring and control capabilities for the invention.

(3) The Suspension Assembly (SA) supports the PIA. During a shock, the SA works with the EDA to allow the PIA to move just enough to avoid exceeding the acceleration limit on the Payload, and then recovers the PIA.

(4) The Energy Dissipating Assembly (EDA) dissipates the shock energy.

(5) The optional Shock Anticipating Assembly (SAA) is a reactive assembly which repositions the PIA just prior to shock so that more displacement is available to absorb or dissipate the shock.

According to one aspect of the invention, a limiting interface for supporting a payload relative to a structure includes a frame assembly attached to the structure, a payload interface assembly for receiving the payload, a suspension assembly disposed between the frame assembly and the payload interface assembly, and an energy dissipating assembly, disposed between the frame assembly and the payload interface assembly. The energy dissipating assembly is adapted to dissipate energy transmitted to the structure, so as to limit a parameter of interest transmitted to the payload. Depending on the particular application, in various embodiments, the parameter of interest can be displacement, time integrals of displacement including velocity, acceleration and jerk, as well as vibration, force, energy, and shock.

Based on an event that causes an input to the structure, the limiting interface can be configured to attenuate the energy, so as to transmit to the payload a predetermined maximum parameter of interest in a predetermined manner. For example, in one embodiment, a force-displacement profile of the payload interface assembly is substantially linear. Alternatively, or additionally, in another embodiment, the force-displacement profile of the payload interface assembly is substantially constant. In yet another embodiment, the force-displacement profile of the payload interface assembly is substantially a square wave.

The limiting interface may optionally include an anticipating assembly disposed between the frame assembly and the payload interface assembly that repositions the payload interface assembly relative to the structure from a neutral position in anticipation of an event. In one such embodiment, the anticipating assembly increases a range of travel of the payload interface assembly relative to the structure in anticipation of an event.

In various embodiments of the invention, the suspension assembly permits relative movement between the payload interface assembly and the structure in a first direction only, when acceleration or other parameter of interest transmitted to the payload is about to exceed a predetermined value. In still other embodiments of the invention, the suspension assembly permits relative movement between the payload interface assembly and the structure in a first direction only, for as long as acceleration or other parameter of interest transmitted to the payload is about to exceed a predetermined value.

According to one embodiment, the limiting interface and the energy dissipating assembly are capable of accommodating a plurality of events. The limiting interface may be reset automatically or, alternatively, manually. In various embodiments of the resetting type, after at least one event, the payload interface assembly is returned to a neutral position by the suspension assembly. In other embodiments, the energy dissipating assembly is capable of accommodating a single event, and can be rebuilt or refurbished to restore functionality.

In various embodiments, whether multiple event, single event, resettable or refurbishable, the energy dissipating assembly may be configured to convert kinetic energy transmitted to the structure at least partially into thermal energy. In some embodiments, the energy dissipating assembly may be configured to deform an element, elastically and, optionally, plastically. The energy dissipating assembly may be a friction brake, of any of a variety of configurations.

The limiting interface may advantageously be adjustable, to accommodate payloads of various configurations and mass, including equipment and personnel. In those instances where the pay load is a person, the payload interface assembly may be a platform, bench, seat, or any suitable supporting structure for a person. Similarly, the structure may be any of a variety of structures, including aeronautic-based, land-based, or water-based vehicles.

According to another aspect of the invention, a method for supporting a payload relative to a structure includes, in one embodiment, the steps of providing a limiting interface attached to the structure and adapted to receive the payload and dissipating energy transmitted to the structure, so as to limit a parameter of interest transmitted to the payload. In one embodiment, the limiting interface does so by converting at least a portion of kinetic energy transmitted to the structure to substantially a square wave force-displacement profile transmitted to the payload. Alternatively or additionally, a magnitude of the force-displacement profile may be substantially constant. In general, the magnitude of the square wave force-displacement profile is less than a predetermined value.

DETAILED DESCRIPTION OF THE INVENTION

Figure 1:
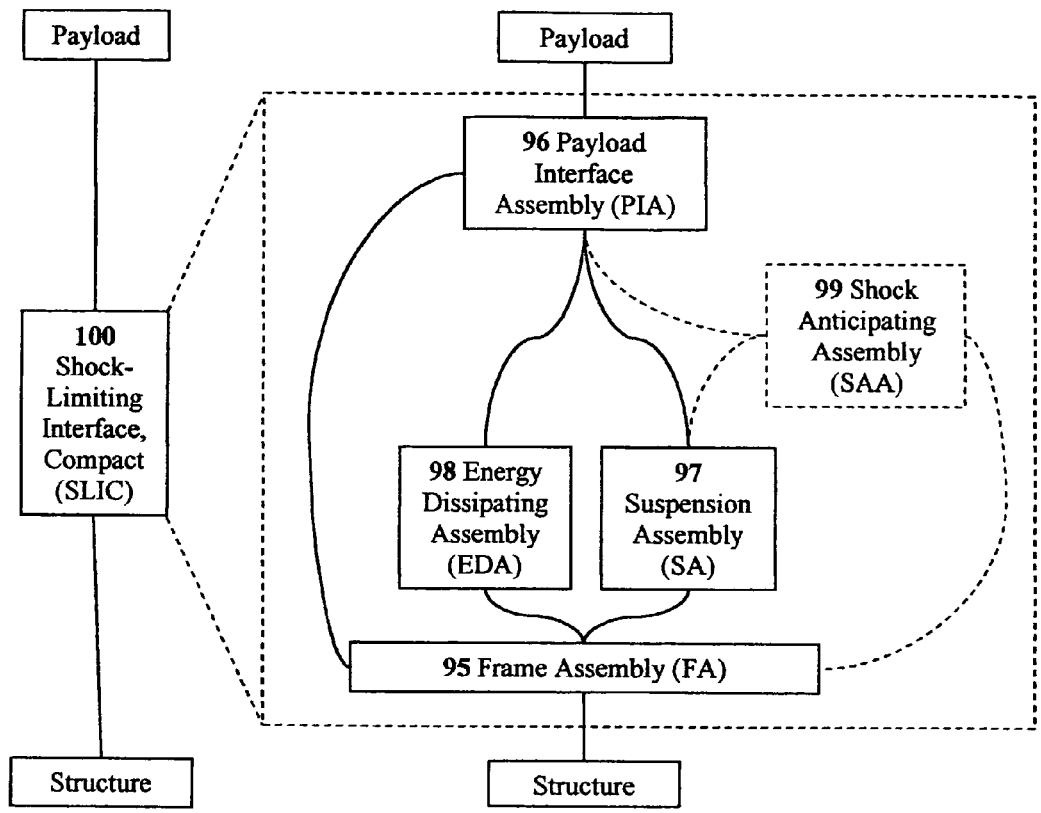
FIG. 1 shows a block diagram of the Payload, a generic SLIC device, and the vehicle (or structure).

In accordance with the foregoing purposes and other purposes and intents, the invention is based upon three require principles and one optional principle, a more expanded discussion of which follows.

Principles of Operation

The first principle is limiting the acceleration on the Payload to a level below that which would cause injury or damage. To this end, a SLIC device is designed so that is cannot sustain a force between the Payload and vehicle greater than that which would cause injury or damage. No matter how large the force or acceleration on the vehicle, the SLIC device only transmits an acceptably low force to the Payload.

The second principle is that the change in relative displacement between the Payload and vehicle is kept to a minimum. This makes the device as compact as is substantially possible without violating the first principle. To achieve this substantially minimum displacement, the SLIC device does not allow relative movement between Payload and vehicle in response to shock unless the acceleration on the Payload is about to exceed the injury or damage limit, and then allows only as much movement as is substantially necessary to absorb or dissipate all the shock energy imposed on the Payload.

The third principle is adjustability to accommodate the masses of various Payloads. More massive Payloads must be supported with more force than less massive Payloads to achieve equal accelerations and thus equal protection from shock.

The optional fourth principle is that the invention react to an impending shock by repositioning the Payload to provide more relative displacement at impact. Since energy is force integrated over distance, more relative displacement means that the energy of a given shock pulse can be dissipated at a lower force.

A corollary principle that follows from the above is that the force-displacement output of the invention upon the Payload be substantially a square wave. The magnitude of a square wave approaches but does not exceed the limiting force, and its pulse width is the shortest possible given the amount of energy to be absorbed. It is the most efficient profile for absorbing any given shock pulse without exceeding the limiting force on the Payload. The invention is unique in that it can transform a shock impulse of thousands of G's peak amplitude and jerk ($d^3x/dt^3$) on the orders of tens of millions of G's per second into a force-displacement profile which is substantially a square wave, of adjustable and substantially constant magnitude.

Another corollary principle is that the present invention can slow a person to a complete stop, safely, in a minimum distance, from speeds of almost arbitrary magnitude.

There are two limits on the capability of the invention to protect against any arbitrary shock. The first limit is in regards to the strength of the FA. The FA must be designed strong enough to withstand two conditions. The first condition is the ability to withstand without significant deformation, the body force resulting from the perhaps thousands of G's acceleration experienced by the vehicle, which is also experienced by the FA. The second condition is that the FA be strong enough to support the force resulting from the user-adjusted acceleration of the masses of the Payload, PIA, SA, EDA, and SSA (if implemented), which must be supported by the FA. The second limit on the capability of the invention is its capacity to fully absorb or dissipate the energy in the shock pulse directed upon the Payload. This is an energy balance criterion. In the time domain, the integral over time of the output acceleration of the SLIC device must be equal to the integral over time of the input acceleration of the shock. In the space domain, the available relative displacement of the Payload with respect to the vehicle must exceed that required to fully absorb the shock. If all the energy is not fully absorbed, then the device will bottom out, spiking the acceleration felt by the Payload.

Concepts of Embodiment

A number of useful shock-limiting applications are conceived. The invention has applications for protecting a Payload housed in a structure as well as a Payload riding in a vehicle. Various seating systems, equipment foundations, cockpits, standing platforms, even entire chambers can be isolated from their host vehicle or their other surroundings. The invention can also be implemented on the exterior of a vehicle, as a shock-limiting bumper to reduce the impact force of a head-on collision. The invention could be installed on the exterior of a fixed structure, such a bridge abutment, to limit the force on the structure which may result from accidental vehicle impact. An amusement park thrill ride offering a vertical free-fail of several hundred feet and "a sudden" thrill stop at the end could be implemented. Another application is as a bumper system on the front end of a vehicle FIG. 1 shows a block diagram of a SLIC device 100 mounted functionally between the Payload and the vehicle (or structure). The SLIC device is shown to be composed of the four required major assemblies, the Frame Assembly (FA) 95, the Payload Interface Assembly (PIA) 96, the Suspension Assembly (SA) 97, and the Energy Dissipating Assembly (EDA) 98, plus the optional fifth major assembly, the Shock Anticipating Assembly (SAA) 99. Each of these assemblies shall be discussed here in generic terms, and later in more detail, with several examples of typical embodiments.

The FA 95 provides structural support to the other major assemblies, and mounts directly to the vehicle or structure. The FA 95 generally constrains the movement of the other major assemblies to within certain geometric bounds, enabling them to function properly. Since the FA 95 is fastened directly to the vehicle, it experiences whatever shocks the vehicle does. The shock on the FA 95 may be attenuated somewhat by plastic deformation of the vehicle frame, but may also possibly be exacerbated by elastic spring-back of the vehicle fame.

The PIA 96 directly interfaces between the Payload and the other major assemblies. It touches and supports the Payload and provides monitoring and control capabilities for the invention. The heart of the PIA 96 is the Payload Pan (not shown in FIG. 1), which is a structural assembly to which the other components of the PIA 96 are attached. The Payload Pan is constrained by the FA 95 to move within certain limits, and is connected to the SA 97 and EDA 98, and also the SAA 99 when implemented. If the Payload consists of shock-vulnerable equipment, the PIA 96 consists of the Payload Pan, the connecting components enabling smooth low-friction movement within the FA 95, the joints and connections to the other major assemblies, appropriate hardware to fasten the equipment, and an Interface Monitoring and Control Panel (IMCP) assembly, which is used to monitor and adjust the performance of the invention. If the Payload is a person or persons, the equipment mounting fasteners would be replaced by various human interface components such as seat pad(s), seat back(s), seat belt(s) and harness(es), a standing platform, arm rest(s), hand rail(s), footrest(s), leg rest(s), lumbar support(s), head rest(s), neck support(s), and other sundry comfort amenities. Depending upon the severity of the shock environment, the PIA may also mount a Vehicle Monitoring and Control Panel (VMCP) assembly used to navigate and pilot the vehicle. This is to fully isolate the personnel, reduce operator fatigue, and improve performance. For military or law-enforcement applications, a communications panel, a weapons control panel, or other mission-specific items, may also be included, for example.

The SA 97 mounts between the PIA 96 and FA 95, except when the optional SAA 99 is incorporated. The SA 97 supports the PIA 96 at the Neutral Position. The Neutral Position is the normal, user-adjustable position of the Payload with regard to the shock vector, for example, the seat height in regards to an upwardly-directed shock. After a shock, the SA 97 restores the PIA 96 to the Neutral Position before the next shock pulse hits. During a shock event, the SA 97 operates in conjunction with the EDA 98 to provide a substantially constant force output between the PIA 96 and FA 95 over the full range of motion of the PIA 96. There are three methods for the SA 97 to function with the EDA 98. One method hereafter known a "SA/EDA Method 1" is for the SA 97 to provide only a nominal supporting force while the EDA 98 provides the bulk of the resistive force as it dissipates energy during the shock stroke. The EDA 98 then disengages, and the SA 97 recovers the PIA 96 to the Neutral Position using the same nominal supporting force, but with damping as it approaches the Neutral Position, to avoid launching the Payload out of the PIA 96. The second method, hereafter known as "SA/EDA Method 2", is for the SA 97 to provide the bulk of the resistive force while it stores the shock energy during the shock stroke, while the EDA 98 is disengaged. The SA 97 then recovers the PIA 96 to the Neutral Position at a force reduced by the EDA 98, which engages to dissipate the stored energy. The third method, "SA/EDA Method 3" combines the first two methods.

The EDA 98 dissipates the shock energy. It works with the SA 97 as described above.

The SAA 99 is the optional assembly. It may be included when the tiring and direction of the shock vector can be predicted with reasonable accuracy. The SAA 99 mounts interposed between the PIA 96 and the SA 97, with the EDA 98 mounted around them. Nominally a reactive assembly, the SAA 99 repositions the PIA 96 relative to the FA 95 just prior to shock so that a greater displacement distance is available to dissipate or absorb the shock energy at impact. This provides two significant advantages. The most obvious advantage is that the shock energy can be absorbed and dissipated at a lower force than would be possible than over a shorter distance. The second advantage is that the Payload's average position is maintained closer to the Neutral Position, assuming that the Payload sweeps through the Neutral Position as a result of the shock. Note that when an SAA 99 is included in the SLIC device 100, the SA 97 and EDA 98 function together under SA/EDA Method 2.

In one of its simplest embodiments, for example as part of a seating system aboard a high-performance planing boat, the SAA 99 simply reacts to the free-fall period before impact. In this example, the SAA 99 provides a continuous upward force upon the PIA 96 at a fraction of the combined weights of the Payload, PIA 96, and the parts of the SA 97 and EDA 98 moving with them. During the time intervals between shocks, the PIA 96 simply remains at the Neural Position, since the upward force of the SAA 99 is too weak to exceed the weight of the components. As the boat becomes airborne speeding off the crest of a wave, an impact shock with some other part of the seaway is imminent. Neglecting aerodynamics, the boat accelerates downward at −1.0 G. The SAA 99 reacts to the free-fall raising the PIA 96 and Payload upwards with respect to the falling boat, creating extra displacement beyond that inherent in the Neutral Position. At impact, the EDA 98 uses the extra displacement to dissipate energy.

An example of a much more sophisticated embodiment of an SAA 99 would use a set of powered actuators to reposition the PIA 96. The actuators would have to receive their commands of when and where to reposition the PIA from a CPU, which in turn would be fed from a sensor array and/or communications link. The sensors would have to be capable of detecting potential shock threats and the CPU would have to be capable of resolving the sensor data in real time to discriminate real shock threats from false ones. The communications link would presumably tell of the onset of a real, perhaps massive shock threat such as an earthquake or nuclear blast. Since electrons move faster than shock waves, there is the possibility that a suitable sensor array networked across the epicenter or ground zero and linked to an appropriate CPU could detect a massive shock event in time to warn nearby SLIC devices so that they could reposition their PIA's.

In general, the SLIC device 100 will function most effectively when the constrained movement of the PA 96 is aligned with the shock vector. Supporting the PIA 96 with three of mutually orthogonal sets of SA 97 and EDA 98 will protect the Payload from any arbitrarily-oriented shock. Alternatively, the entire SLIC device 100 can be mounted in a gimbaled assembly.

Embodiment of the Invention: A Typical SLIC Device

Figure 2:
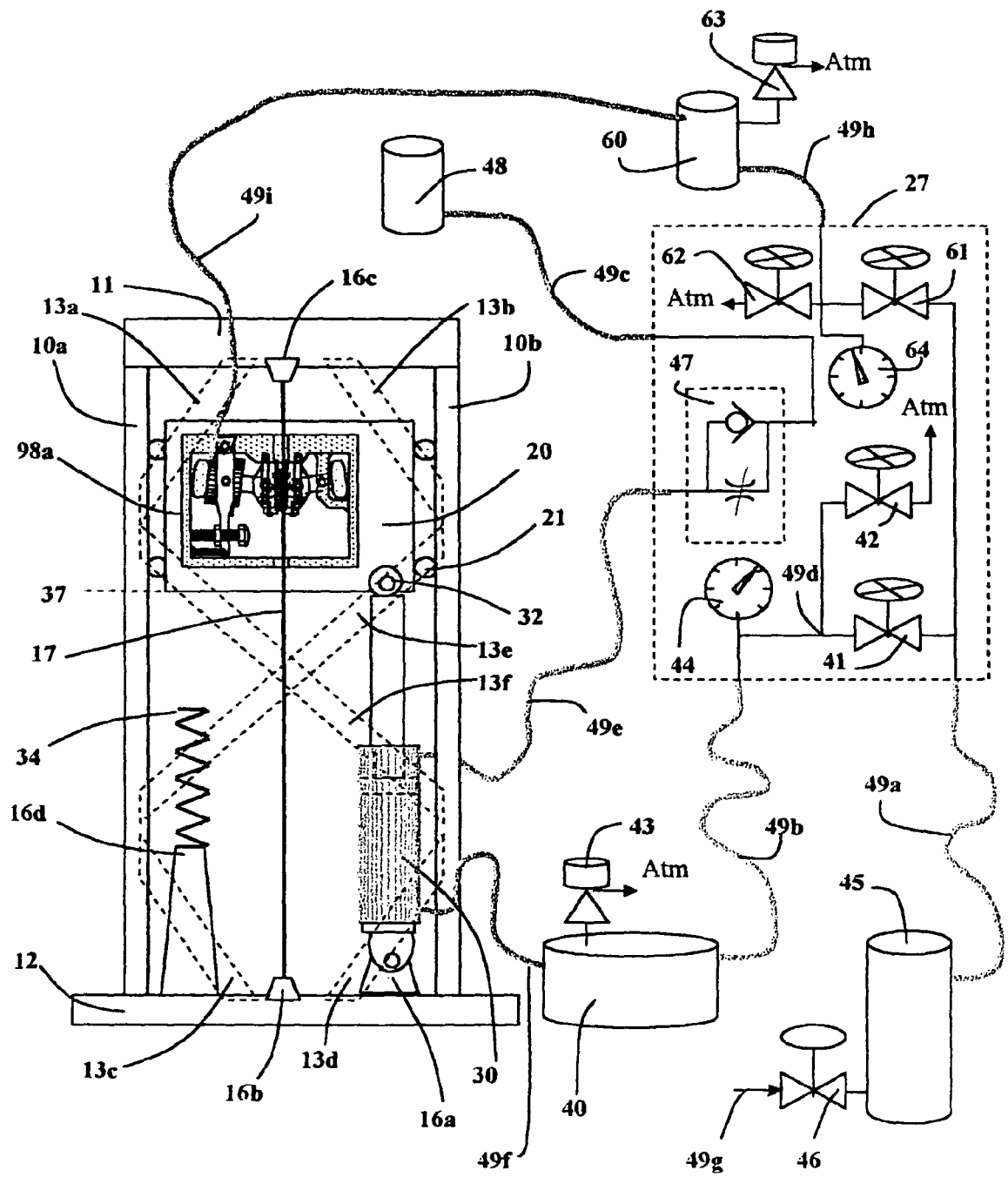
FIG. 2 shows a basic SLIC device implemented as a seating system which uses a straight-mounted SA actuator and "Check-Clamp" type EDA.

FIG. 2 shows an embodiment of a typical SLIC device implemented as a vehicle seat intended to protect against an upwardly-oriented shock. The Payload Pan 20 rides up and down on rails, 10a and 10b, and is equipped with rollers 21 to reduce friction. The rails are fastened at their upper ends to crossmember 11, and at their bottom ends to foundation 12, which is fastened to the deck of the vehicle. Braces 13a, 13b, 13c, 13d, 13e, and 13f (shown in phantom) help the crosshead 11 and foundation 12 maintain alignment of the rails 10a and 10b. Similar braces (not shown) leading to the foundation or vehicle deck forward and/or backward stabilize the rails 10a and 10b from swaying forward or backward (into or out of the paper), and together with the foundation 12 and the other braces 13a-f provide torsional stiffness as well. The Payload Pan 20 supports the Payload, in this case, a person. In this case then, several typical seat features are mounted to the Payload Pan 20 such as a seat bottom, seat back, lumbar support, padding, armrests, footrests, seatbelt, shoulder harness, etc. All these features are considered typical of many seating systems and are omitted from the drawing for clarity. An important assembly mounted to the Payload Pan 20 in a spot convenient to the user is the Interface Control Panel (ICP) 27, which has been drawn to the side of the FA for clarity. The ICP 27 enables the user to monitor and adjust the performance of the SLIC device. In this particular embodiment, the components of the ICP 27 are the SA accumulator fill valve 41, SA accumulator bleed valve 42, SA pressure gage 44, flow control valve 47, EDA fill valve 61, EDA bleed valve 62, and EDA pressure gage 64, each of which shall be discussed more fully later. The Payload Pan 20 is supported by the SA actuator 30, which is mounted to the Foundation 12 at clevis bracket 16a, and attached to the Payload Pan 20 at clevis bracket 32. The SA actuator 30 supports the Payload Pan 20 at the Neutral Position 37. The upward support force developed by the SA actuator 30 is a function of its piston area and the pressure of the gas in the SA accumulator 40. The gas in the cap end of the SA actuator 30 and SA accumulator 40 are in free communication through appropriate hose and piping 49f. The SA accumulator 40 provides extra gas volume to lessen the pressure rise due to compression of the SA actuator 30 as the Payload Pan 20 strokes downward. The user can monitor the pressure in the SA actuator 30 at the ICP 27 using the SA pressure gage 44. The user can raise the initial pressure in the Sa actuator 30 by opening the SA fill valve 41, allowing higher-pressure gas from the flask 45 to enter through appropriate piping and hose 49a and 49b. Similarly, the user can reduce the SA actuator 30 pressure by opening the SA bleed valve 42, allowing some gas to escape to the atmosphere through appropriate piping and hose 49b and 49d. On this type of SLIC device where the EDA 98a, fully discussed later, provides the bulk of the resistance versus shock, the initial pressure in the SA actuator 30 would typically be adjusted to provide an upward force of between 1.2 to 1.4 times the combined weight of the Payload plus PIA. After initial adjustment, the pressure can be readjusted as desired to counteract pressure changes due to temperature change or leakage. The SA actuator 30 provides all the force during the upward stroke restoring the Payload Pan 20 to the Neutral Position 37. Over-pressurization of the SA accumulator 40 is prevented by the SA relief valve 43. To reduce contamination of the head-end chamber of the SA actuator 30 when the piston strokes downward, makeup air comes from a plenum 48 which is connected through appropriate hose and piping 49e. A flow control valve 47 is installed in the piping 49e which allows free flow of gas into the head-end chamber but throttles the gas coming out. The user can adjust the position of the flow control valve 47 to control the rate of ascent of the Payload Pan 20 back to the Neutral Position 37. The flask 45 is charged from a separate air source such as an onboard compressor through appropriate supply piping 49g by opening the flask supply valve 46. The pressure in the EDA accumulator 60 is monitored at the ICP 27 using the EDA pressure gage 64. The EDA accumulator 60 pressure can be adjusted by opening either the EDA fill valve 61 to increase gas charge from the flask 45, or opening he EDA bleed valve 62 to allow some gas to escape to atmosphere. The EDA Accumulator 60 supplies pressure to the EDA actuator (65, in FIG. 3) which is part of EDA 98a and will be discussed more fully in FIG. 3. The SA and EDA are arranged to work in SA/EDA Method 1, described above. A spring snubber 34 is mounted to a bracket 16d attached to the foundation 12 to prevent excessively hard impact or bottoming out the SA actuator 30 in case of hose rupture or other cause of pressure loss in the SA actuator 30. The suspension bar 17 is fastened to the crossmember 11 at clevis bracket 16c and attached to the foundation 12 at clevis bracket 16b. The EDA 98a is fastened to the Payload Pan 20.

Figure 3:
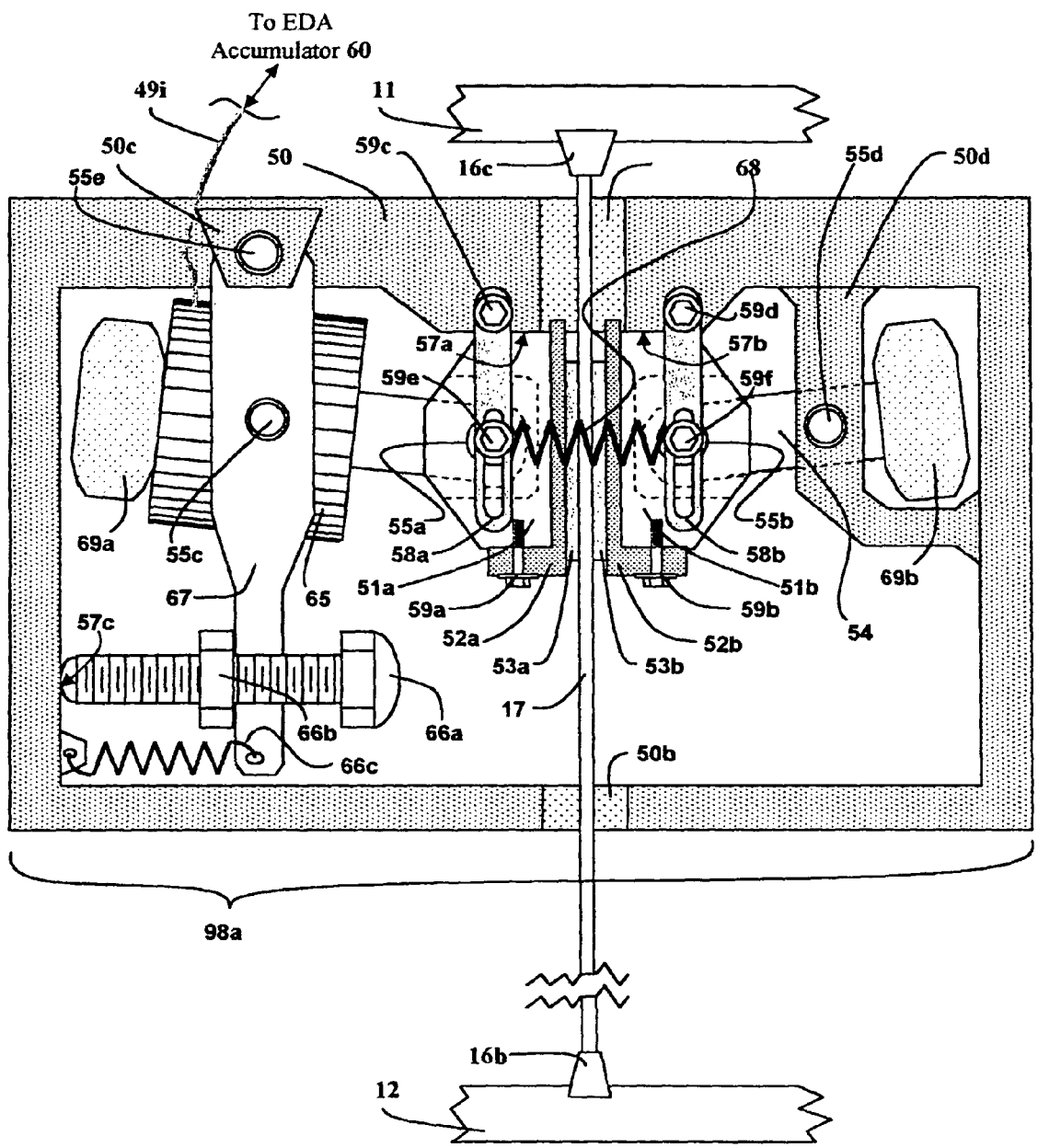
FIG. 3 shows details of the Check-Clamp EDA used in the SLIC device of FIG. 2.

FIG. 3 shows the details of EDA 98a from FIG. 2. We coin the term "Check-Clamp" to describe this type of EDA because of the way it functions. EDA 98a dissipates energy at an adjustable, substantially constant force when the relative movement of the EDA 98a relative to the suspension bar 17 is downward, and allows free movement of the EDA 98a at only nominal force when its relative movement is upward. The top end of the suspension bar 17 is fastened to the crosshead 11 (shown in part) at clevis bracket 16c, and its bottom end is attached to the foundation 12 (shown in part) at clevis bracket 16b. The suspension bar 17 passes through the EDA framework 50 though milled slots 50a and 50b. The EDA framework 50 is fastened to the Payload Pan 20 (not shown in this Figure). Pressure pads 51a and 51b have been fitted with brake shoes 52a and 52b which nave brake linings 53a and 53b bonded to them. The brake shoes 52a and 52b are fastened to the pressure pads 51a and 51b using threaded fasteners 59a and 59b. One of the pressure pads 51a is attached to one end of the EDA actuator 65 by bushed clevis pin 55a. The EDA actuator 65 is fitted with a body trunnion mount, the trunnion pins 55c of which pivot in bushings at an intermediate point along lever 67. The upper end of lever 67 is attached to the EDA framework 50 at clevis bracket 50c using bushed clevis pin 55e. The lower end of lever 67 is tapped to accept jackscrew 66a. The other end of jackscrew 66a bears on the EDA framework 50 at a hardened point 57c, so turning the jackscrew 66a in or out will adjust the position of the lower end of the lever 67, which in turn adjusts the position of the trunnion pins 55c, which is the pivot point for the EDA actuator 65. A periodic maintenance adjustment of the jackscrew 66a is needed to compensate for wear in the brake linings 53a and 53b. The jackscrew 66a is equipped with jam nut 66b to lock it in position once adjusted. A spring 66c keeps the jackscrew 66a in contact with the EDA framework 50 to stabilize the adjusted position of the bushed clevis pin 55c, and prevent peening damage to either the hard point 57c or the end of the jackscrew 66a. A counterweight 69a is fastened to the other end of the EDA actuator 65 in order to approximately balance the moments of the EDA actuator 65, the pressure pad 51a, the brake shoe 52a, the brake lining 53a, the fastener 59a, and the bushed clevis pin 55a about the bushed trunnion pins 55c. This prevents gravity or other body forces from causing rotation of the EDA actuator 65 about the bushed trunnion pins 55c. The other pressure pad 51b is attached to one end of the linkage 54 using bushed clevis pin 55b. The linkage 54 is attached at an intermediate point to the EDA framework 50 at clevis bracket 50d using bushed clevis pin 55d. A counterweight 69b is fastened to the other end of the linkage 54 and performs a balancing function similar that of counterweight 69a. The cap end chamber of the EDA actuator 65 is pressurized from the EDA accumulator 60 (shown in FIG. 2) through piping/hose 49i. The EDA actuator 65 can therefore clamp the brake linings 53a and 53b onto the suspension bar 17 at a specific normal force equal to the product of the piston area of the EDA actuator 65 times the pressure of the EDA accumulator 60 times the sine of the angle made between the EDA actuator 65 and the suspension bar 17. But this clamping only occurs when the suspension bar 17 rises with respect to the EDA framework 50, which happens during the shock down stroke. At all other times, the brake linings 53a and 53b are in contact at with the suspension bar 17 but at a much smaller normal force provided by the tension in spring 68 and counterweights 69a and 69b (see below for more details). During the downward shock stroke, friction between the brake linings 53a and 53b and the suspension bar 17 cause the brake linings to stick to the suspension bar. As the suspension bar 17 rises, the EDA actuator 65 and linkage 54 pivot upwards with it, bringing the upper surfaces of the pressure pads 51a and 51b into contact with the hardened surfaces 57a and 57b on the EDA framework 50. The EDA 98a will continue to move downward on the suspension bar 17 only if the downward force on it exceeds the frictional resistance between brake linings 53a and 53b and the suspension bar 17. The frictional resistance is equal to two times the product of the clamping force normal to the suspension bar 17 times the coefficient of friction between the brake linings 53a and 53b and the suspension bar 17. The EDA 98a continues to move downward until the all the shock energy has either been dissipated by friction or stored in the increased enthalpy of the gas in the SA accumulator, SA actuator, and associated piping and hoses (40, 30, etc. in FIG. 2). Then, the SA actuator (30 in FIG. 2) applies a net upward force on the Payload Pan (20 in FIG. 2), which raises the EDA 98a with respect to the suspension bar 17. The friction of the brake linings 53a and 53b with the suspension bar 17 causes the EDA actuator 65 and linkage 54 to rotate downwards. The downwards rotation is aided by the obtuse angles that the EDA actuator 65 and linkage 54 make with the suspension bar 17. After a few degrees of downward rotation, the EDA actuator 65 bottoms out, totally releasing the clamping force of the pressure pads 51a and 51b on the suspension bar 17. Excessive downward rotation is prevented by the tension in spring 68, and stop bars 58a and 58b which are fastened to the EDA framework 50 by threaded fasteners 59c and 59d, and fastened to the tapped holes in bushed clevis pins 55a and 55b by threaded fasteners 59e and 59f. The EDA 98a therefore provides only the minimal frictional resistance due to the spring 68 clamping force as it is raised up with respect to the suspension bar 17. The tension spring 68 provides enough force to maintain continuous contact between the brake linings 53a and 53b and the suspension bar 17, so that when another shock hits, the whole clamping process will be repeated.

More on Some of the Concepts Presented in the SLIC Device of FIGS. 2 and 3.

The counterweights 69a and 69b only need to approximately balance the EDA actuator 65 (and attached components) about bushed trunnion pins 55c and linkage 54 (and attached components). It is preferred to make the counterweights slightly heavier than would be required to balance precisely. This is so that the shock vector will tighten rather than loosen the pressure pads 51a and 51b upon the suspension bar 17. As the brake linings 53a and 53b wear away the imbalance becomes even more favorable. While slightly overloading the counterweights 69a and 69b implies that negative-G body forces (free fail for example) will tend to loosen the clamping, the tension spring 68 can easily be made strong enough to maintain the brake linings 53a and 53b in firm contact with the suspension bar 17. Alternatively, counterweights would not be needed at all if the spring 68 were made stiff enough, but this would increase the resistance during the recovery.

It is important that pressure pads 51a and 51b stop at the hardened surfaces 57a and 57b prior to cam-locking over center. This ensures prompt and easy disengagement from the suspension bar 17. Stopping the rotation about five degrees short of locking over center is a good design point.

Figure 4:
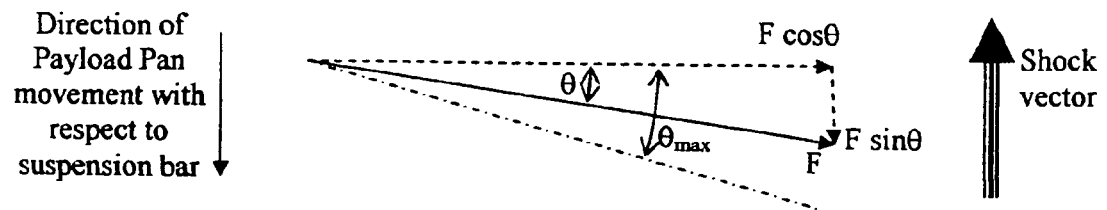
FIG. 4 shows a vector diagram of the clamping force in the Check-Clamp EDA of FIG. 3.

FIG. 4 shows the vectors involved in clamping the Pressure Pads 51a and 51b to the suspension bar 17. It is important that the brake linings 53a and 53b stick and not slide on the suspension bar 17 at initial engagement at the start of a shock pulse. The maximum angle that the EDA actuator 65 and linkage 54 can rotate to and still clamp is $\theta$max. Examining the geometry of one side of the clamping mechanism, we can resolve the thrust vector F of the EDA actuator 65 into a vertical component $F \sin \theta$ and the horizontal component $F \cos \theta$. The vertical component tends to make the brake lining slip on the suspension bar 17, and the horizontal component multiplied by the frictional coefficient tends to make it stick. Though the brake linings 53a and 53b would typically have a somewhat higher static coefficient than dynamic, we shall use the dynamic coefficient to be conservative in case there may be some slipping before full clamping. Typical brake lining material has a minimum dynamic frictional coefficient of 0.35 or greater depending upon the material. This results in a maximum drop angle $\theta$max of 19.3 degrees to ensure clamping. The preferred embodiment uses a conservative design value of no more than thirteen degrees for $\theta$max. This corresponds to a frictional coefficient of 0.23, or a 34% safety margin to allow for slight degradation of the brake lining material due to contamination, pitting, etc.

Bottoming out the EDA actuator 65 at or before $\theta$max is important to the proper disengaging of the clamping action.

As the brake linings 53a and 53b wear away, the clamping action will disengage at a smaller and smaller angle $\theta$, and would eventually approach five degrees (i.e., no clamping at all) if the jackscrew 66a and jam nut 66b were not adjusted to compensate. Strictly speaking, the jackscrew 66a and jam nut 66b would not have to be readjusted until the brake linings 53a and 53b have worn the clamping angle $\theta$ down to 5+ degrees, but this would be imprudent. However, readjusting too frequently would seem burdensome. A reasonable compromise is to readjust the jackscrew 66a and jam nut 66b when the clamping angle $\theta$ has worn down to about ten degrees, and to readjust it back to thirteen degrees.

In general, whenever a clevis joint is specified, it may be replaced by a spherically-mounted bearing.

In general, all clevis pins are bushed with an appropriate friction-reducing and/or anti-corrosion bushing fitted to the ID of the clevis pieces and OD of the clevis pin. Bushings may be deleted if an analysis of the load, friction, wear, and corrosion circumstances of the clevis joint warrant.

The adjustment and retainer features provided by the jackscrew 66a, jam nut 66b, and spring 66c can just as effectively be provided in a variety of other common ways familiar to those practiced in the art. All of these other common ways are conceived.

The adjustments of the valves 41 and 42 to maintain pressure in the SA actuator 30 can be automated. There are several ways to do this, each of which involves electronically (digitally) sampling either the average pressure or the pressure at a specific Payload Pan 20 position (the Neutral Position 37, for example) and comparing it to a reference signal corresponding to the initially-adjusted pressure value. If the measured signal differs from the reference signal by more than a specific amount, a control algorithm can trigger solenoids or similar actuators attached to valves 41 and 42 to admit or release gas and restore the pressure to the initial value.

The volume of the SA accumulator 40 in comparison to the swept volume of the SA actuator 30 affects the increase in the SA actuator force as it strokes. As a first-order approximation, the compression and expansion of the gas in the SA actuator 30 and the rest of the gas-filled components connected to it can be modeled as adiabatic. If air is used as the working fluid, then if the volume of the accumulator 40 and all connected hosing and piping 49a, 49b, 49c, 49d, and 49f is on the order of twenty times the swept volume of the SA actuator 30, then the upward force exerted by the SA actuator 30 will remain substantially constant throughout its stroke range (within about 3.5% of its mean value, or within about 7% of its initial value). This is shown by Table 1 and FIG. 4 of the Provisional patent application filed 2 Jan. 2002.

The spring 68 is shown as a tension spring, and is shown mounted over the axial centerlines of bushed clevis pins 55a and 55b. Neither of these is required for satisfactory operation. Other ways are conceived for performing the same function (maintaining the brake linings in contact with the suspension bar) by use of one or more compression springs, tension springs, leaf springs, rotary springs, etc., attached at various points, allowing the pressure pads to tilt with respect to the suspension bar 17.

The use of a pneumatic actuator to support a load subject to shock is not novel. The use of a pneumatic actuator in conjunction with various mechanisms and mounting schemes to attempt to make the support substantially constant is novel. The use of such a support arrangement with a separate device which is intended to dissipate the shock energy at a substantially constant force is also novel. The use of such a combined mechanism with another mechanism designed to anticipate a shock event and increase the displacement available for absorbing/dissipating the shock energy by repositioning the Payload is also novel.

In FIGS. 2 and 3, the FA is composed of parts 10a, 10b, 11, 12, 13a, 13b, 13c, 13d, 13e, 13f, 16a, 16b, 16c, 16d, 17, the fasteners used for mounting to the vehicle, the (unpictured) support braces running into the paper, an (unpictured) cover plate to keep hands away from moving machinery, and (unpictured) maintenance access hatches in the cover plate. For simplicity of illustration on the rails 10a and 10b are shown as providing only lateral and roll support to the Payload Pan 20 through the rollers 21. The rails actually provide support in the surge (fore and aft), yaw, and pitch directions as well. The rails only allow motion of the Payload Pan in the heave (vertical) direction.

In FIGS. 2 and 3, the PIA is composed of parts 20 and 21, and the assembly 27. It is to be understood that several mundane features common to seats are not shown for ease of illustration. Though only one roller is called out in piece 21, it is to be understood that a number of rollers are required, in each of the movement directions restrained by the rails 10a and 10b. The important function of piece 21 is to reduce friction in the allowable movement direction (heave) and support the loads restraining the Payload Pan 20 in all other directions. Piece 21 could therefore be embodied by a linear bearing, wheels on axles mounted to the Payload Pan 20, wheels on axles mounted to the rails 10a and 10b, or even by low-friction skid surfaces.

In FIG. 2, the SA is composed of parts 30, 32, 34, 40, 43, 48, and the hoses 49b, 49c, 49e, and 49f. Parts 41, 42, 44, 47 and piping manifold 49d are parts of the IMCP assembly 27, which is part of the PIA.

In FIGS. 2 and 3, the EDA is assembly 98a, which is fully discussed in FIG. 3.

The SLIC device depicted in FIGS. 2 and 3 do not have an SAA.

More Concepts

Figure 5:
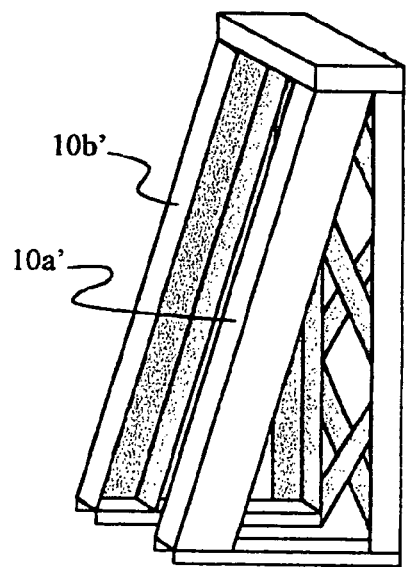
FIG. 5 shows a variant of the FA from the SLIC device of FIG. 2, in which the rails are tipped backwards.

FIG. 5 shows one way in which the rails 10a' and 10b' can be tipped backwards by ten to fifteen degrees in order to align them more closely with the orientation of the shock sector on a high-performance boat. Studies have shown that the sharpest shock vectors are often tipped backwards by about ten to fifteen degrees. FIG. 5 also shows one type of channel which provides the type of support needed to allow only one-degree of freedom movement of the PIA. Channels with cross-sections other than U-shapes are conceived. The important thing is that the channel and friction-reducing bearing work together to restrain the PIA in all directions but one, and in that direction, to allow low-friction movement.

Figure 6:
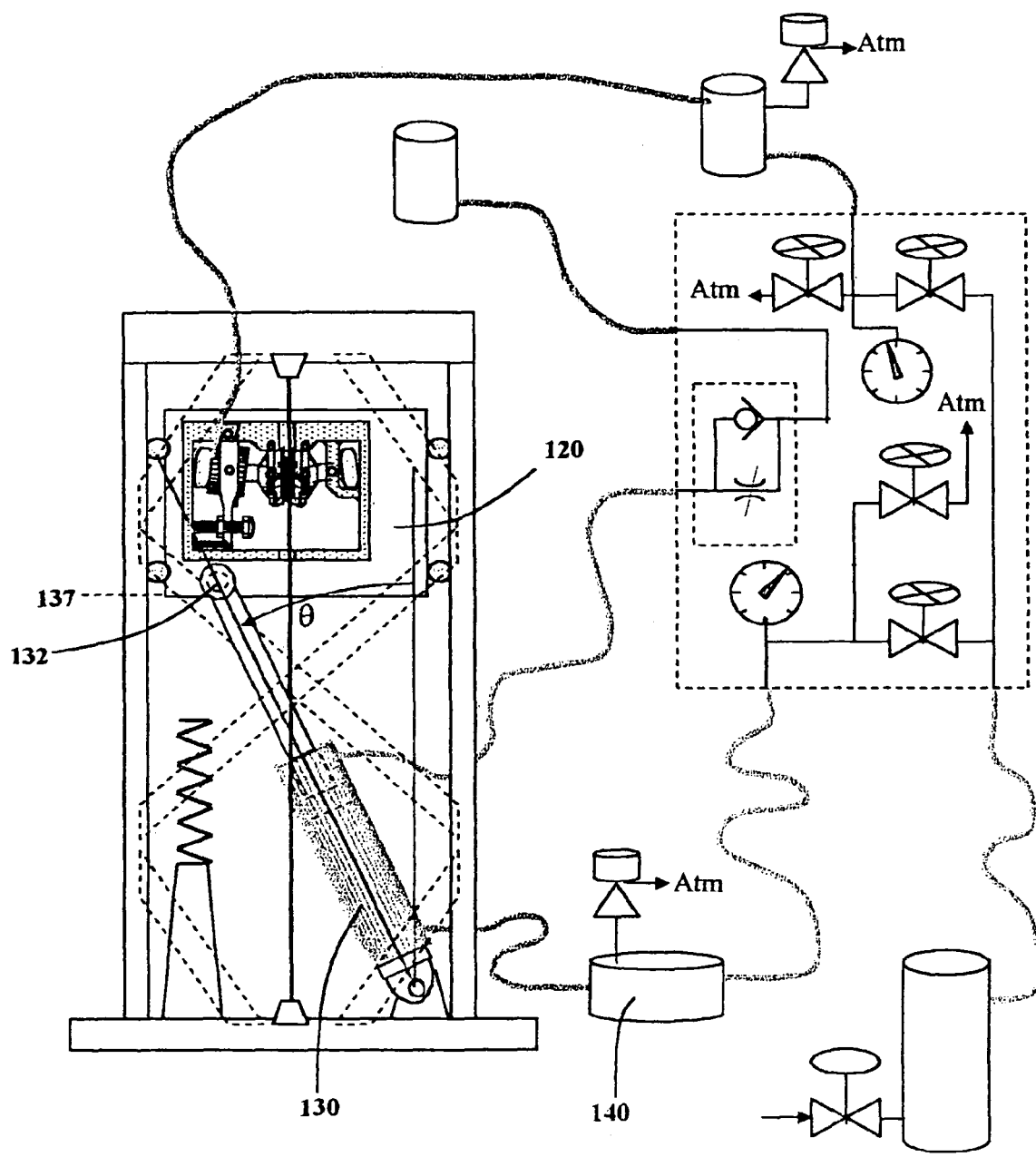
FIG. 6 shows a SLIC device in which the SA actuator has been mounted at an angle with respect to the direction of movement of the PIA.

FIG. 6 shows a SLIC device similar to that of FIG. 2, but with some differences in the SA. First, the SA actuator 130 is mounted at the angle θ with respect to the direction of movement of the Payload Pan 120. Second, it is attached to the Payload Pan 120 at a different location, clevis bracket 132. Third, the volume of the SA accumulator 140 is smaller than the volume of the SA accumulator 40 of FIG. 2. The SA accumulator 140 is smaller to increase the pressure rise as the SA actuator 130 strokes. The upward component of the SA actuator 130 force vector is diminished by the cosine of the angle θ. Fourth, the SA Actuator 130 must have a larger piston area than that of SA actuator 30, just to equalize the lift force on the Payload Pan 120. Alternatively, the initial system pressure could be increased, or a combination of each. Fifth, the stroke of the SA actuator 130 may be, but does not have to be, shorter than the stroke of the SA actuator 30, because of the angle mounting. Sixth, the FA has to be stronger to withstand the extra side loading imposed by the horizontal component of the SA actuator 130. Several design dependencies flow from the decision to mount the SA actuator 130 at an angle. The larger the mounting angle θ, the smaller the SA accumulator 140 must be in order to maintain the same vertical lift component on the Payload Pan 120. The larger the mounting angle θ, the stronger the FA has to be to withstand the unbalanced lateral load. The larger the mounting angle θ, the greater the increase in piston area of the SA actuator 130 must be as compared to a simple straight-mounted SA actuator 30, or alternatively, the greater the increase in initial system pressure must be. The larger the mounting angle θ, the shorter the stroke of the SA actuator 130 may be as compared to a simple straight-mounted SA actuator 30. The larger the mounting angle θ, the greater the transient pressure rise in the pneumatic system, so care must be taken to avoid over-pressurizing the system. The larger the mounting angle θ, the greater the transient temperature increase in the pneumatic system, so care must be taken to ensure that any temperature-sensitive components such as seals, gaskets, or hoses are not damaged. Using the above guidelines, it is possible to tailor a suitable SA design optimized for particular performance attributes within the capabilities of he components selected.

Figure 7:
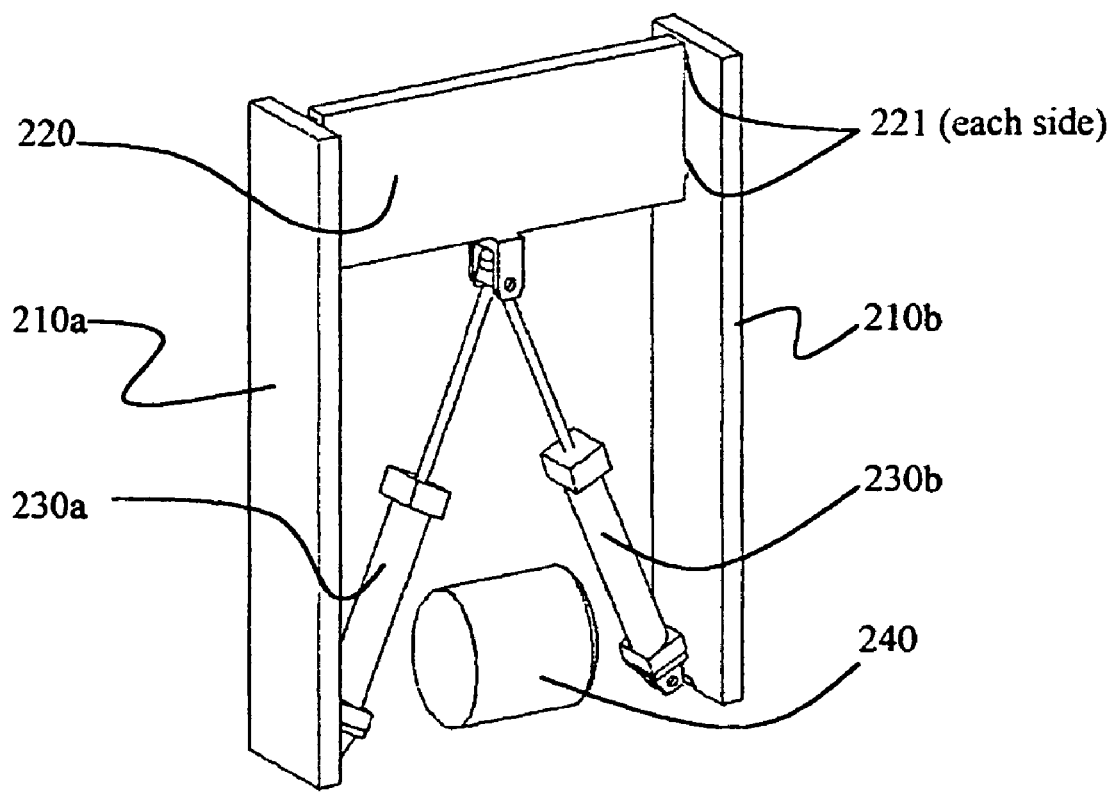
FIG. 7 shows a SLIC device using twin pneumatic actuators mounted at mirror angles to one another to support the Payload Pan.

FIG. 7 shows another SLIC device. Here, two matched SA actuators 230a and 230b have been mounted as mirror images to one another. They support the Payload Pan 220, and cancel each other's lateral loadings. The components of the FA, including rails 210a and 210b can therefore be made less strong and lighter, etc. Another variation, which raw or may not be advantageous from an arrangements standpoint, is the relocation of the SA accumulator 240 to within the FA boundaries. In general, however, keeping the components closer together helps save space and may improve performance by reducing weight, reducing time lag due to friction, etc. Note also that the pneumatic hosing must branch to supply both SA actuators 230a and 230b.

The rendering of FIG. 7 and the renderings in the Appendices of the Provisional Patent Filings have been simplified to enhance clarity. Most components common to the previous devices have been omitted from the Figure. The rails 210a and 210b, though illustrated as simple flat surfaces capable of providing restraint in only the lateral and roll directions, in fact are channel sections or similar and provide restraint to the Payload Pan 220 in every direction except linear movement along their long axes. Similarly, the roller wheels 221 are illustrated in only one direction when in fact they must roll along the rails 210a and 210b to transfer the restraining forces to the Payload Pan 220 and reduce friction of its movement. Only the lack fee of the Payload Pan 120 is illustrated.

Figure 8:
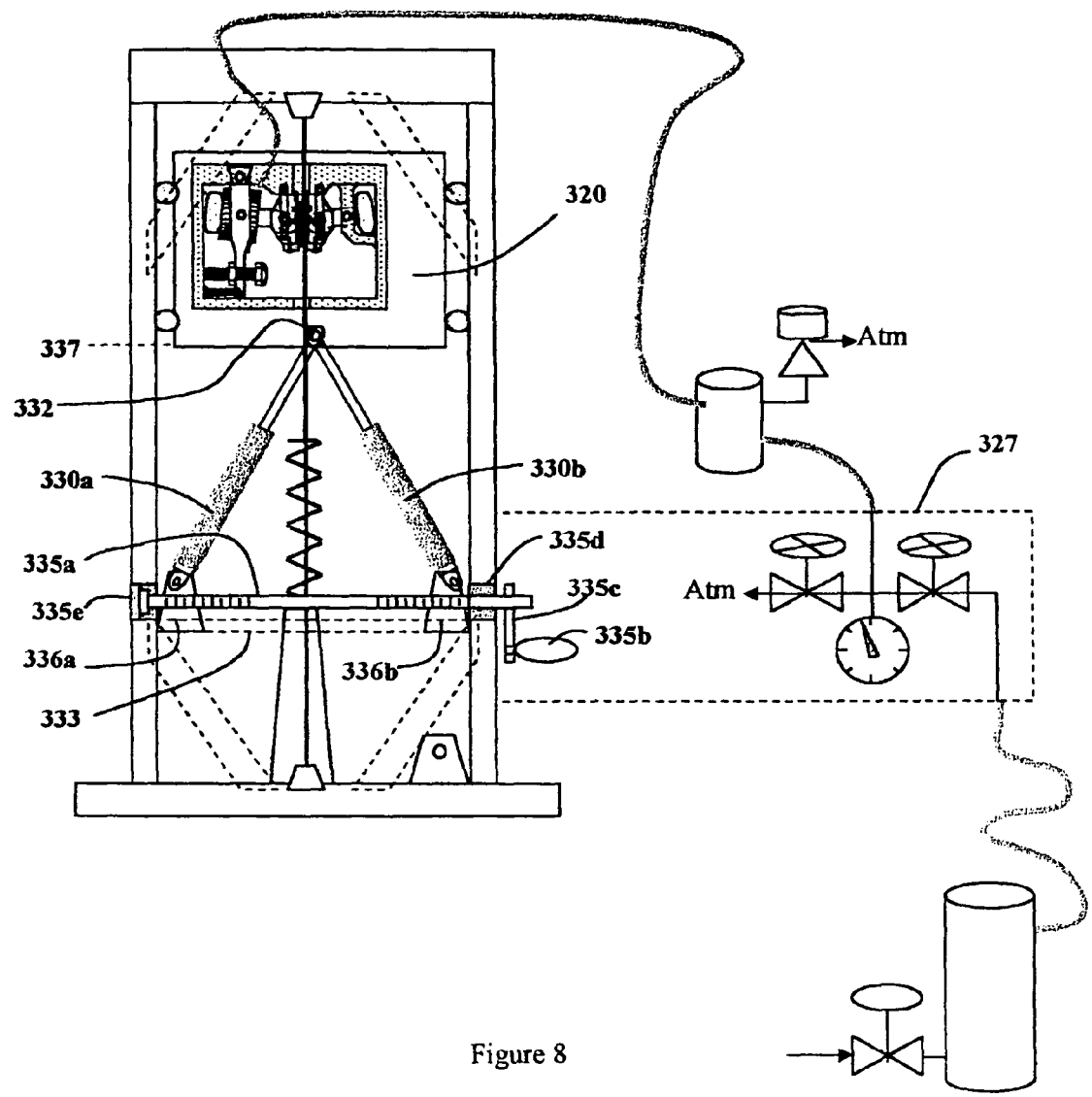
FIG. 8 shows a SLIC device similar to that of FIG. 7, but using twin matched gas charged lift supports.

FIG. 8 shows a SLIC device which uses a matched set of gas charged lift supports 330a and 330b as the SA actuator. These actuators are pre-charged with gas to provide a certain force output which increases with the compression stroke. They can be purchased with self-contained damping, which can be implemented on either the compression or extension stroke, or both. For this purpose, damping on compression is unneeded and undesirable. It would disrupt the substantially constant force upon the Payload Pan 320, making it dependent upon the relative velocities of the Payload Pan 320 and rails 310a and 310b. A certain amount of damping on the extension stroke is desirable, as it allows deletion of the flow control valve, plenum, and hosing which are required to perform the damping function in the device of FIG. 2. This is an advantage which also saves space, weight, and cost, as is the capability to delete about half of the remaining pneumatic system, as compared to the SLIC device of FIG. 2. The disadvantage is that adjustability of force and damping is limited. FIG. 8 shows one way of providing some adjustability in force, by using a turnbuckle-like screw 335a. One end of the screw 335a has a left hand thread, the other a right hand thread. Each end of the screw threads into one of the clevis blocks, 336a and 336b to which the lower ends of each support 330a and 330b are pinned. A stabilization piece 333 supports the vertical load of the gas charged supports 330a and 330b, relieving the screw 335a of that duty so it only has to support the laterally-directed loads. The stabilization piece 333 also prevents the clevis blocks 336a and 336b from rotating with the screw 335a. The screw 335a is supported radially by a bushing 335d at one end, and radially and axially by a combination bushing/thrust bearing 335e at the other end. When the handle 335b and crank 335c are turned, the turnbuckle screw 335a rotates, which either draws clevis blocks 336a and 336b closer together or further apart, depending upon the direction of rotation. This changes the angle of each gas charged support 330a and 330b, changing the vertical component of their support on the Payload Pan 320. Note that since the handle 335b is used to control the performance of this SLIC device, it is functionally part of the PIA, within the IMCP 327.

Although not illustrated, another way of adjusting the support force on the Payload Pan 320 on this or similar types of SLIC devices is to add or subtract gas charged supports. One way of implementing this is to mount one clevis bracket on the Payload Pan 320 and one clevis bracket on the FA for each gas charged actuator potentially desired, then simply quick-pin each support into or out of each clevis place as needed.

The lower clevis brackets can be mounted on the turnbuckle screw 335a in the manner of clevis blocks 336a and 336b for added adjustability once pinned in place. The other shortcoming is lack of damping adjustability. The supports are factory-sealed and the damping is not field-adjustable. If the damping is too high, the PIA will not recover to the Neutral Position 337 before the next shock. Therefore, supports should be procured with acceptably-low damping. If extra damping is needed, a separate, adjustable damping device can be added externally.

Though gas charged lift supports are designed for static lift situations such as holding open the rear hatch on a minivan or opening the engine cover on a boat, they can be used as an SA actuator provided they are not used to dissipate the energy of the shock pulse. The heat buildup will cause premature failure. Therefore, when used, gas charged lift supports should be implemented by SA/EDA Method 1.

The discussion above assumes that the use of gas charged supports which develop force while extending, which is the only configuration normally available. All the above would still apply to supports which develop force while retracting, but tailored to the new configuration.

Figure 9:
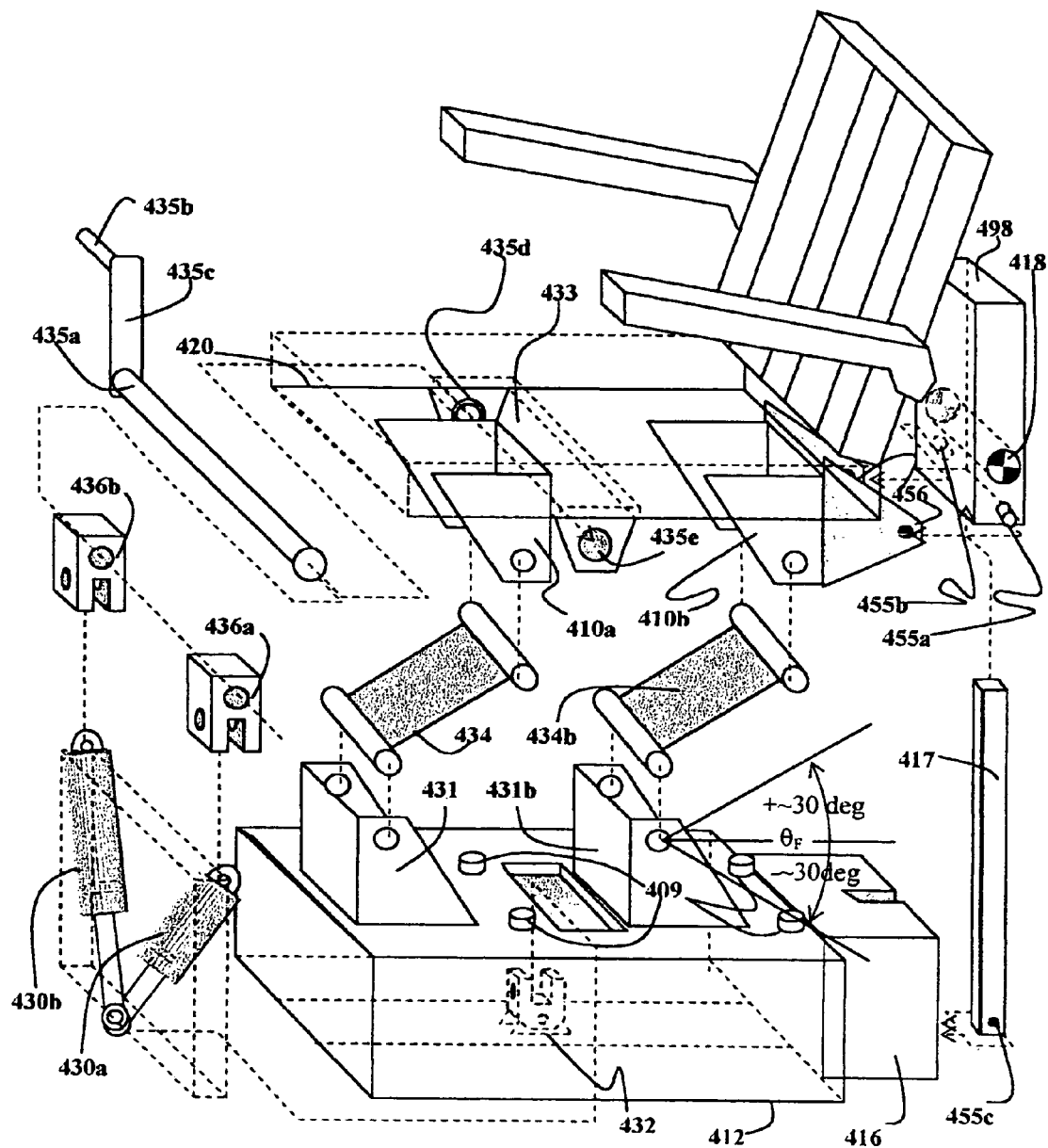
FIG. 9 shows a SLIC device in which the FA uses a four-bar linkage to constrain the movement of the PIA.

FIG. 9 shows a SLIC device with a substantially different FA which incorporates a four-bar linkage instead of the rails and rollers presented previously. Since the characteristics of motion of four-bar linkages are so well known to those skilled in the art, additional detailed discussion on that aspect of the device will not be necessary here. However, two points are worthy of note. The first is that device is designed to take heavy side loads (into and out of the paper). Since a four bar linkage is nominally a planar mechanism, the extra strength in the side direction comes from the design of the brackets 421a, 421b, 431a, and 431b, the linkages 434a and 434b and the foundation 412 and Payload Pan 420 to which they are attached. The laterally-oriented gusset plates help stiffen the brackets against side forces, and the linkages are designed to resist deformation under torsion. The second point is the nominal range of motion of the Payload Pan 420. Established as approximately plus or minus 30 degrees from horizontal (which is not necessarily the Neutral Position), plus or minus 30 degrees of movement is a good compromise between strict linear motion and ease of manufacture, which translates as cost for the consumer. Using a length of six inches between pivot points for the linkages 434a and 434b, a vertical range of six inches is achieved while only allowing a fore-aft variance of 0.8 inches. This angular range is usually acceptable.

In FIG. 9, the SA is the same type as for the SLIC device in FIG. 8, a matched pair of gas charged lift supports 430a and 430b are mounted at mirror images to one another with respect to the vertical, and are attached at their base to clevis bracket 432 and at their upper ends to clevis blocks 436a and 436b. The upward force of these supports is adjusted in the same manner as for FIG. 8. Turning handle 435b attached to crank 435c rotates turnbuckle-threaded screw 435a which draws the clevis blocks 436a and 436b closer or further away from one another, changing the magnitude of the upward vector component of the gas charged supports 430a and 430b. The upward force of the clevis blocks 436a and 436b press on the stabilization crosshead 433, which takes the bending moment off the turnbuckle screw 435a and also prevents the clevis blocks 436a and 436b from rotating excessively with the turnbuckle screw 435a. The turnbuckle screw 435a, etc. have been oriented to provide easier access to the handle 435b. The turnbuckle screw is supported at one end by a radial bushing 435d and at the other end by a combination thrust/radial bushing 435e, each mounted in appropriate brackets. A snubber piece (or snubbers) 409 prevents hard impact between the Payload Pan 420 and foundation 412 in case of an exceptionally energetic shock in comparison to the adjusted resistance of the EDA 498 and upward force-displacement of the SA actuators 430a and 430b.

Figure 10:
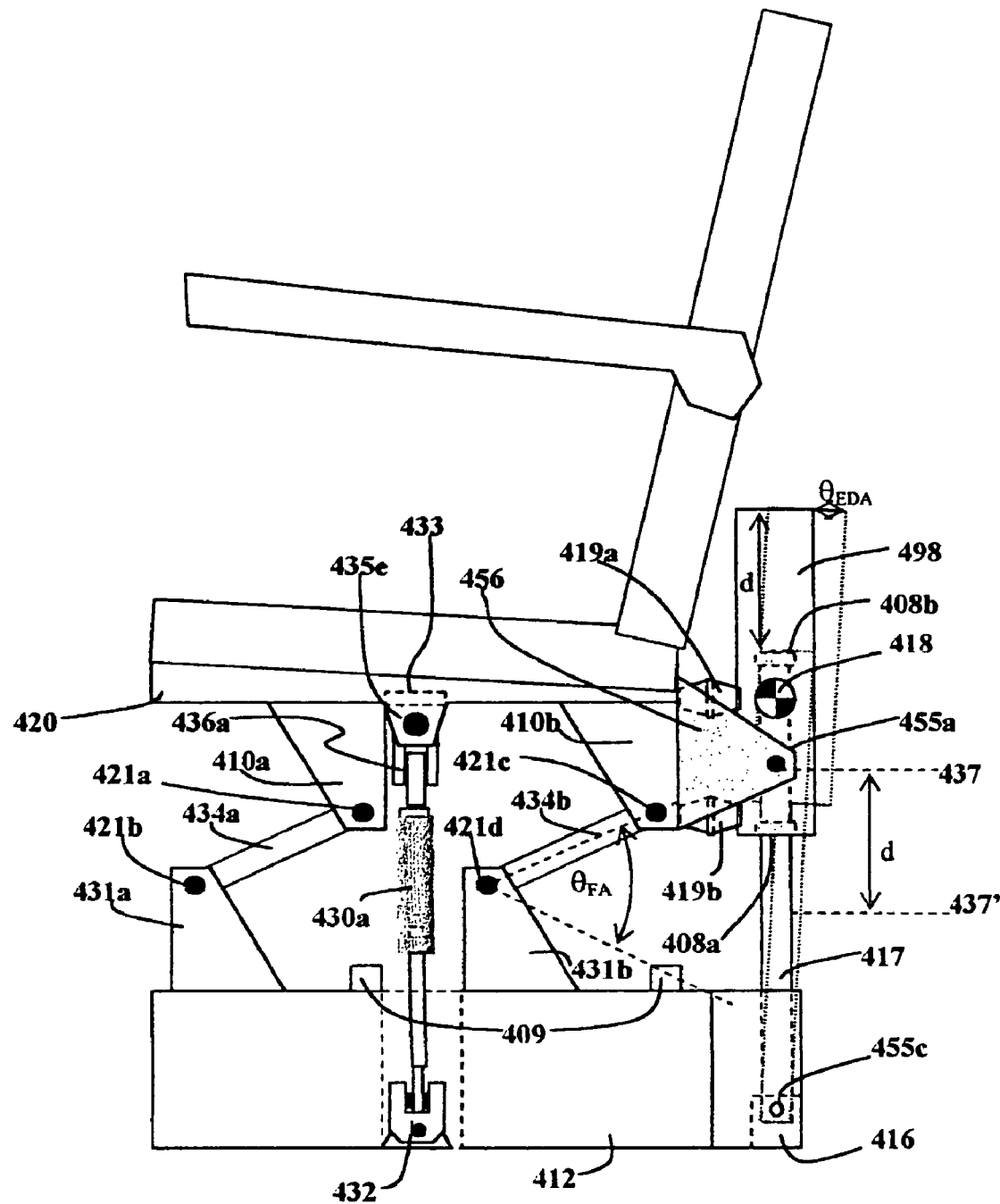
FIG. 10 is a different view the SLIC device of FIG. 9.

FIG. 10 shows the same SLIC device as in FIG. 9, from a different perspective. The EDA 498 is shown at the rear of the device. This EDA uses the same one-way clamping principle as the previous EDA's, but it has a difference in that it uses a push-bar 417 instead of the suspension bar to transfer the force to the FA. The push bar 417 is attached to the FA at the foundation 412 at clevis bracket 416 using clevis pin 455c. The EDA 498 is attached to the Payload Pan 420 at clevis bracket 456 using trunnion pins 455a and 455b. The clevis brackets 416 and 456 are oriented to accommodate the rotation of the EDA 498 and push bar 417 through the angle $\theta_{EDA}$, as the four bar linkage swings through the angle $\theta_{FA}$, and the vertical displacement d. Adequate space must be provided to allow freedom of movement. Also, suitable cover panels (not shown) should be installed over the moving machinery pasts to protect personnel from pinch or chafe hazards, etc.

Using a push bar such as 417 has the advantage that the FA can be shorter, saving weight and space, and possibly improving aesthetics. The FA does not have to extend upwards just to hang the suspension bar. However, unlike the suspension bar, the push bar 417 is subject to buckling, and thus needs to be designed stiff enough to not buckle under the maximum expected load. The maximum expected load is the product of the sum of the weight of the PIA plus the weight of the heaviest passenger plus his gear, times the maximum user-adjustable G-loading for the device.

The ends of each SA actuator, the gas charged supports 430a and 430b require freedom of movement in two rotational directions, pitch and roll (assuming the seat faces fore-aft). As such, a spherically-mounted clevis bearing, spherically-mounted bearing, resiliently-bedded clevis joint or similar joint is required to ensure standard service life.

Because the four-bar linkage moves the PIA in an arc instead of linear motion and because the EDA 498 is of the push rather than pull type, the issue of EDA 498 alignment with the push bar 417 must be addressed. In general, the EDA 498 should always be aligned to the push bar 417 to ensure optimum performance and normal service life. Many simple ways of doing this are conceived and will be immediately familiar to those skilled in the art. Methods include use of a linear bearing between the push bar 417 and EDA 498 housing similar to that used in the head end of a hydraulic actuator. Various other bearings and bushings, spring-loaded sliding shoes, etc. are also conceived. The preferred embodiment uses bushings 408a and 408b to between the Push bar 417 and EDA 498 housing to alleviate friction and provide some stability, combined with locating the trunnion pins 455a and 455b between the EDA center of resistance 418 and the far end clevis pin 455c of the push bar 417. Alignment and stability of the pushing force vector is then assured to be collinear between the trunnion pins 455a and 455b and the clevis pin 455c. The EDA center of resistance 418 is the point where the EDA force can be considered to act upon the push bar 417, which in practical terms is the center of EDA clamping force on the pressure pads. If desired to help alleviate vibration and father minimize pitching of the EDA 498, one or more springs or snubbers, 419a and 419b can be interposed between the Payload Pan 420 and the EDA housing 498.

Figure 11:
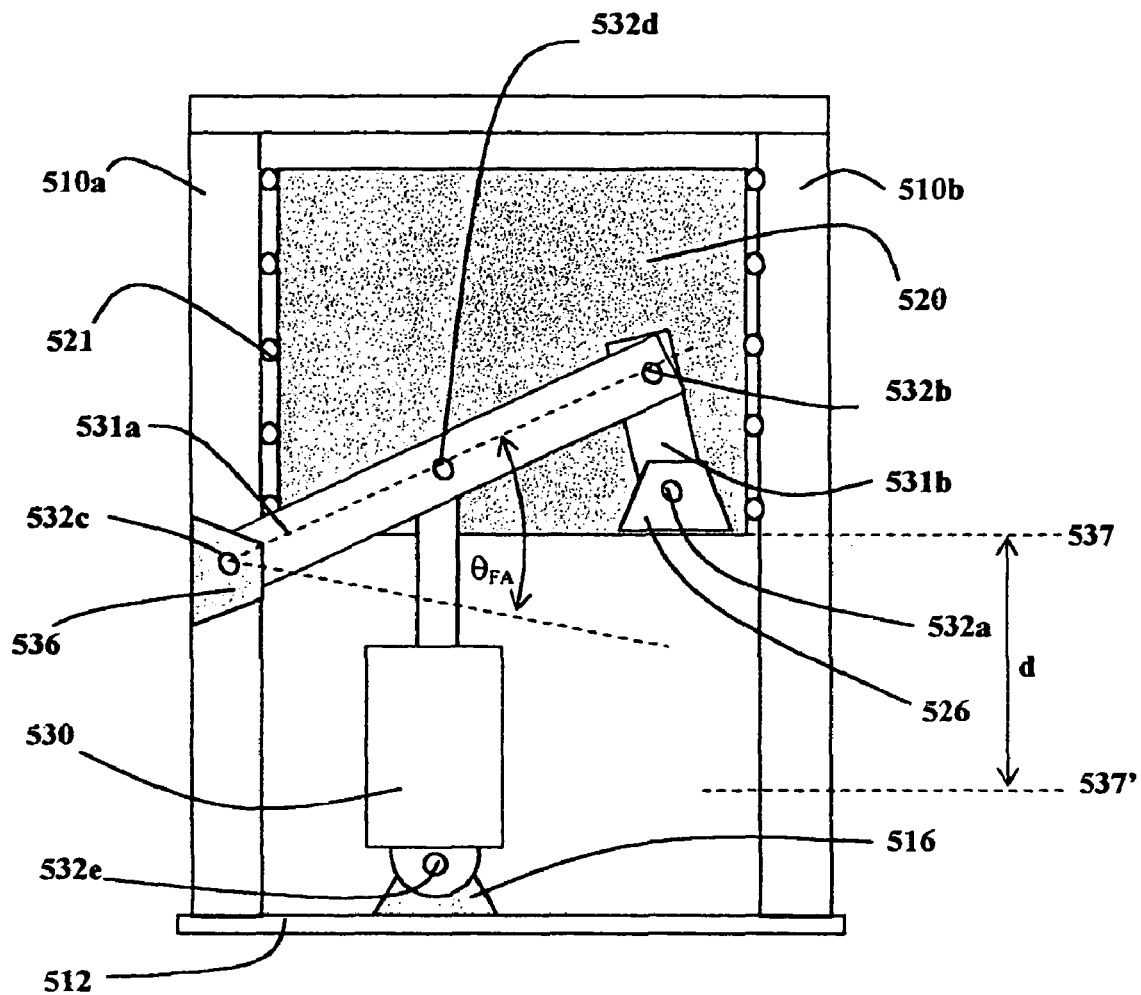
FIG. 11 shows a SLIC device featuring a bell crank and linkage to amplify movement and reduce the force of the SA actuator on the Payload Pan.

FIG. 11 shows a SLIC device featuring a bell crank and linkage to amplify the movement and reduce the force of the SA actuator on the Payload Pan. Most components common to previous SLIC devices have been omitted for clarity. SA actuator 530 is connected at one end to foundation 512 at clevis bracket 516 and clevis pin 532e. The other end of the SA actuator 530 is connected to bell crank 531a at an intermediate point by clevis pin 532d. One end of the bell crank 531a is attached to the FA at clevis bracket 536 and clevis pin 532c. The other end of bell crank 531a is pinned to one end of linkage 531b by clevis pin 532b. The other end of linkage 531b is attached to the Payload Pan 520 at clevis bracket 536 using clevis pin 532a. The Payload Pan 520 translates along the rails 510a and 510b supported by the rollers 521 in the standard way of previous SLIC devices. One advantage of using the bellcrank 531a and linkage 531b mechanism is to transform the force-displacement output of the SA actuator 530 into one that is more desirable. This may be done by adjusting, either by design or by user adjustment, the location of clevis pin 532d in relation to the other pins 532b and 532c and the overall length of the bellcrank 531a. Another advantage is that standard-off-the-shelf pneumatic actuators or gas charged supports can be used for the SA actuator 530. Gas charged supports are available only in certain strokes, dimensions, and force outputs, yet there is an advantage to using them when possible so that about half of the otherwise-required pneumatic system can be deleted. The disadvantage is that the extra components (bellcrank 531a, linkage 531b, etc.) add weight, require more volume, and cost more than using just the gas charged support alone.

Several other concepts for substantially constant-force SA's are detailed in the Provisional patent applications in Appendices A, B, C, and D. Each of these concepts basically combines a force-producing component with one or more techniques and/or mechanisms which transforms its force-displacement output into a substantially constant force over its range of motion. It is felt that these additional concepts are straightforward enough to be clearly understood by those skilled in the art without explanation beyond that provided herein and in the Provisional applications.

The definition of "substantially constant force" requires clarification. Substantially constant means maintained within a certain range, such as within thirty percent, ten percent, or four percent of the mean value. In general, for SLIC devices using SA/EDA Method 1 can maintain an output force constant to within the difference between the static and sliding coefficients of friction between the brake linings (x53 series) and the suspension bar or push bar (x17 series). Since the static coefficient of friction is generally larger than the sliding coefficient, the force peaks just before sliding starts. For best efficiency, its best to choose a brake lining material where the static and sliding coefficients are fiery close. SA/EDA Method 1 SLIC devices depend on the EDA to provide the bulk of their resistance to shock. While sliding, the frictional force is very steady. For SLIC devices which use SA/EDA Method 2, in which the SA provides the bulk of the support force during the shock pulse, the variance in support force can generally be kept within ±3.5 percent of the median value over the full range of PIA movement. There are several ways of doing this, some more complicated than others, and several ways are detailed in the Provisional patent application of 2 Jan. 2002. The claim of substantially constant force is therefore warranted, especially considering that most traditional shock-handling techniques are functions of the shock magnitude and rise rate, and hence vary widely in their force-displacement response depending upon the shape of the shock pulse.

In general, handling the shock using S/EDA Method 1 saves space, weight, and cost over devices using SA/EDA Method 2. The most intuitive explanation for this is that Method 1 devices simply dissipate the energy, whereas Method 2 devices have to both store and dissipate the energy.

Figure 12:
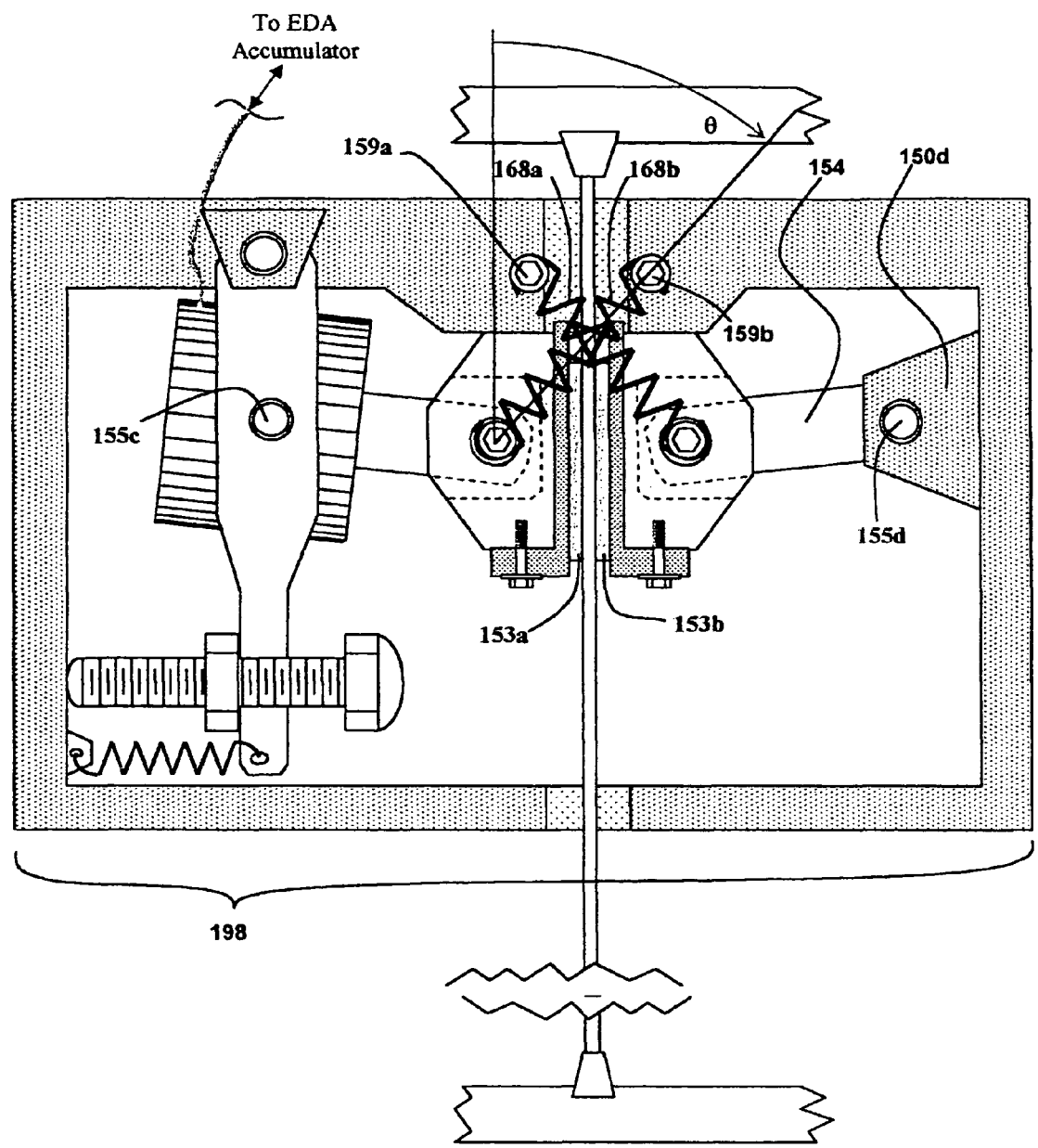
FIG. 12 shows a Check-Clamp type EDA similar to that of FIG. 4 but with springs mounted at angles replacing the counterweights, drop stops, and spring.

FIG. 12 shows a Check-Clamp type EDA which is similar to one in FIG. 3, but the counterweights 69a and 69b, spring 68, and drops stops 58a and 58b have been replaced by springs 168a and 168b mounted at the angle θ by fasteners 168a and 168b. The clevis bracket 150d supporting the right end of the linkage 154 is also simplified. The advantage of this EDA over the one in FIG. 2 is that it is simpler and lighter. Its important that the springs 168a and 168b provide enough upward force that they will maintain the brake linings 153a and 153b in contact with the suspension bar 117 even when subjected to the maximum body force (which is user-adjustable) on the respective unbalanced loads about clevis pins 155c and 155d. Note that a weaker spring can be used if the mounting angle θ is decreased, and that the mounting angle can be zero or negative if desired.

Figure 13:
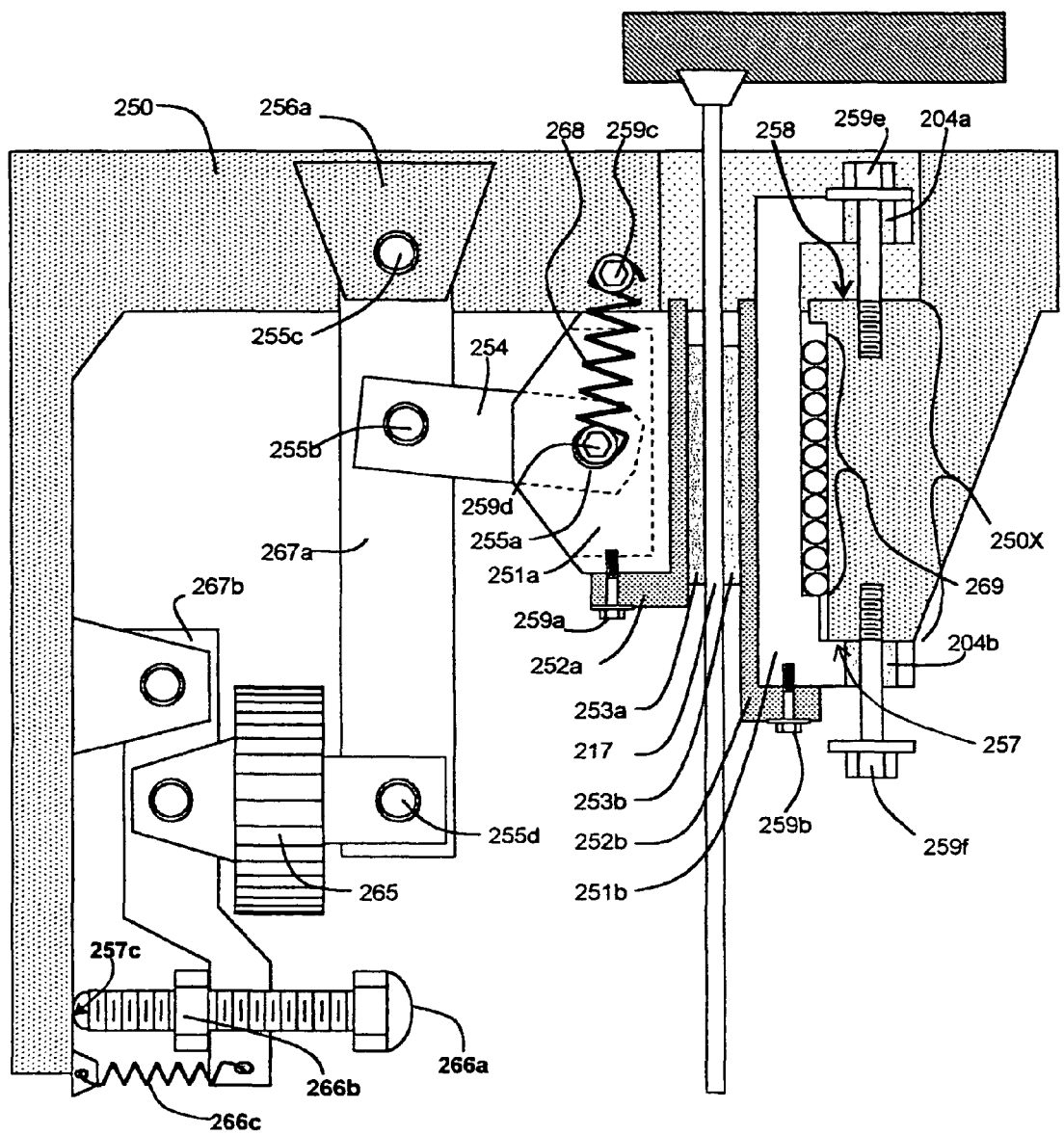
FIG. 13 shows a Check Clamp type FDA which uses a lever to amplify the clamping force of the EDA actuator, a roller bearing replacing the linkage on one side, and a more sensitive mechanism for adjusting the engagement/disengagement of the clamping feature.

FIG. 13 shows a Check Clamp type EDA similar to the others but with a lever 267a to amplify the clamping force of the EDA actuator 265, a mechanism which makes adjusting the drop angle (θ in FIG. 3) easier by making it less sensitive to rotation of the jackscrew 266a, and a roller bearing 269 replacing the linkage under one of the pressure pads 251b. The clamping force exerted upon the pressure pads 251a and 251b is the product of the EDA actuator 265 force multiplied by the lever ratio of lever 267a, which is the length between axes of bushed clevis pins 255c and 255d divided by the length between axes of bushed clevis pins 255b and 255c. The movement distance at the pressure pads is the movement at the EDA actuator 265 divided by the lever ratio of lever 267a. This makes adjustment of the engagement/disengagement of the clamping feature easier, since it is less sensitive to rotations of the jackscrew 266a. The adjustment is made easier still (by being made less sensitive to improper angular position of jackscrew 266a) through the action of lever 267b. The movement at the EDA actuator is the movement at the jackscrew 266a divided by the lever ratio of lever 267b. On the right side of FIG. 13, the pressure pad 251b is supported by a roller bearing 269 (or similar feature such as low-friction skid surface, etc.) to assist in disengaging the clamping feature. The pressure pad 251b bears on a section of the EDA framework 250X and is held in place by restraining fasteners 259e and 259f. The pressure pad 251b is restrained from movement in any direction except parallel to the suspension bar 217, and is restrained from excessive movement in that direction as sell by making contact with hard points on the EDA framework 257 and 258. Replacing the linkage with the roller bearing 269 helps save space to the right of the suspension bar 217. Note that each of the above three changes could have been implemented independently of the others.

Figure 14:
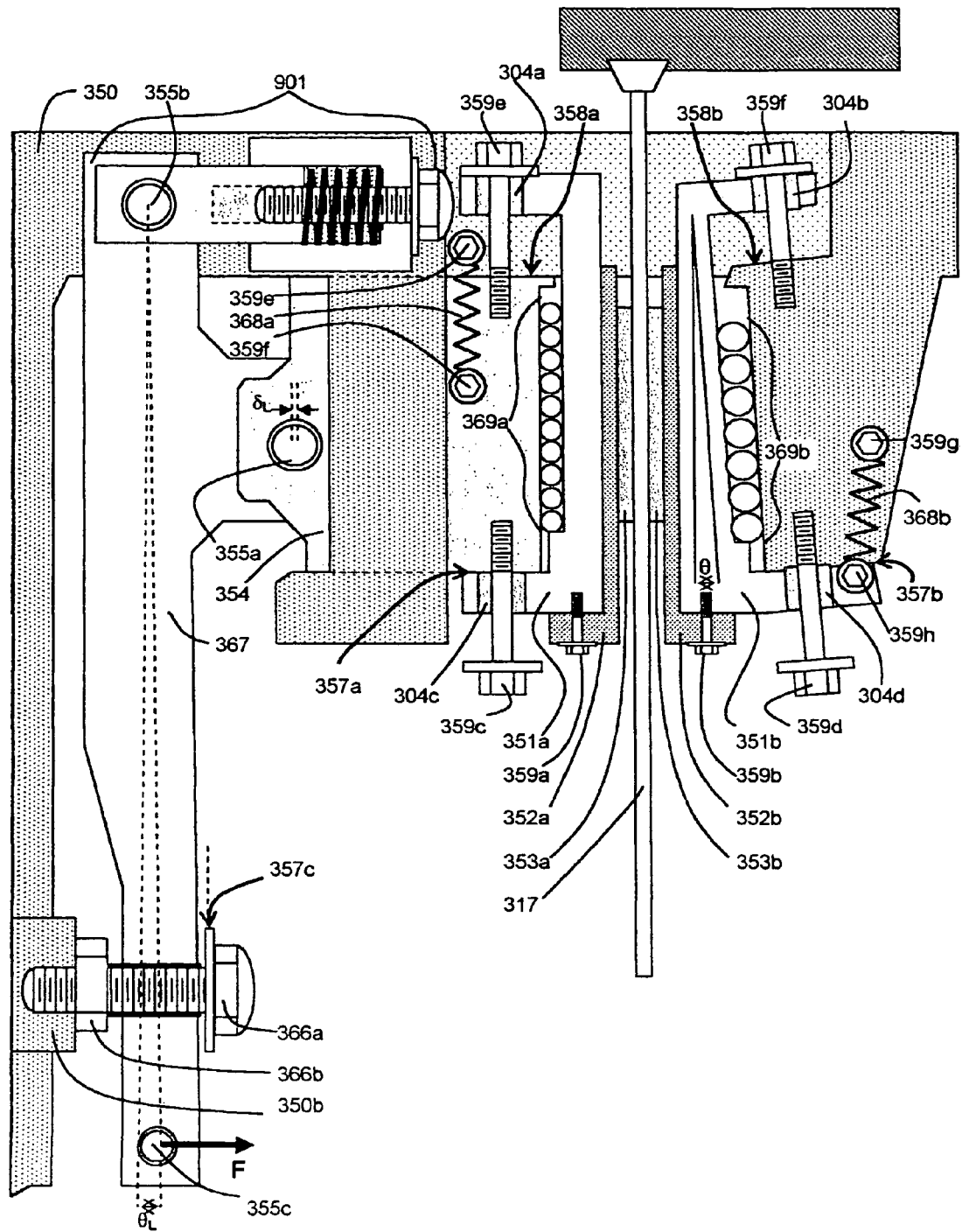
FIG. 14 shows a Check Clamp type EDA in which both pressure pads are mounted on roller bearings.

FIG. 14 shows a Check Clamp type EDA which uses a plunger 354 to apply the clamping force on the pressure pads 351a and 351b. Brake shoes 352a and 352b are fastened to the pressure pads using fasteners 359a and 359b and have brake lining material 353a and 353b bonded to them respectively. The pressure pads 351a and 351b ride on roller bearings (or ball bearings, low-friction skid pads, etc.) 369a and 369b respectively, and are held in place and constrained to linear motion by their interfering geometry with the EDA framework 350 or plunger 354 and fasteners 359a, 339b, 359c, and 359d. One or both of the roller paths of bearings 369a and/or 369b are positioned at an angle $\theta_P$ with respect to the long axis of suspension bar 317. Springs 368a and 363b are mounted by fasteners 359e, 359f, 359g, and 359h in order to maintain contact between the brake linings 353a and 353b and the suspension bar 317 once the clamping pressure is disengaged. The plunger 354 is fastened to the lever 367 at an intermediate point by clevis pin 355a. The plunger 354 is constrained to linear motion only by sliding in an appropriate slot cut in the EDA framework 350. A force F is applied at one end of lever 367 at clevis pin 355c. The other end of lever 367 is pinned to an adjusting assembly 901 by clevis pin 355b. The adjusting assembly 901 is used to adjust the drop angle at which the clamping feature engages and disengages, and to compensate for wear in the brake lining material 353a and 353b. Adjusting Assembly 901 is fully discussed in FIG. 15. The lever 367 is constrained to rotate through arc $\theta_L$, which constrains the plunger 354 to move only through displacement $\delta_L$. The length of the arc $\theta_L$ can be adjusted by turning jackscrew 366a which passes through a hole or slot in lever 367 and threads into tapped boss 350b on EDA framework 350. The rotational position of the jackscrew 366a can be locked by tightening jam nut 366b. The EDA is shown with its clamping feature fully engaged, with the pressure pads 351a and 351b pressing on surfaces 357a and 357b respectively and the force F fully applied to lever 367. To disengage the clamping feature, the EDA framework 350 has to move upward relative to suspension bar 317. The angle $\theta_P$ assists this disengagement by effecting an upwardly-directed vertical component of the clamping force upon the EDA framework 350. Friction causes the brake pads 353a and 353b to stick to the suspension bar 317 as the EDA framework 350 rises. The distance between the bearing races for the pressure pads 351a and 351b increases as the EDA framework 350 rises, so the plunger 354 moves to the right. This allows the lever 367 to rotate counterclockwise until it makes contact with the jackscrew 366a on surface 357c, relieving the clamping force. The EDA framework 350 can continue to move upwards as the brake linings slide up the suspension bar 317 being resisted by a small friction force due to the action of springs 368a and 368b (and its weight, etc.).

Note that the method of stopping the lever 367 at surface 357c to redirect the force F off the pressure pads 351a and 351b can also be used to disengage the clamping feature on the previously-discussed EDA's, instead of using the bottoming-out of the EDA actuator to relieve the clamping force.

Figure 15:
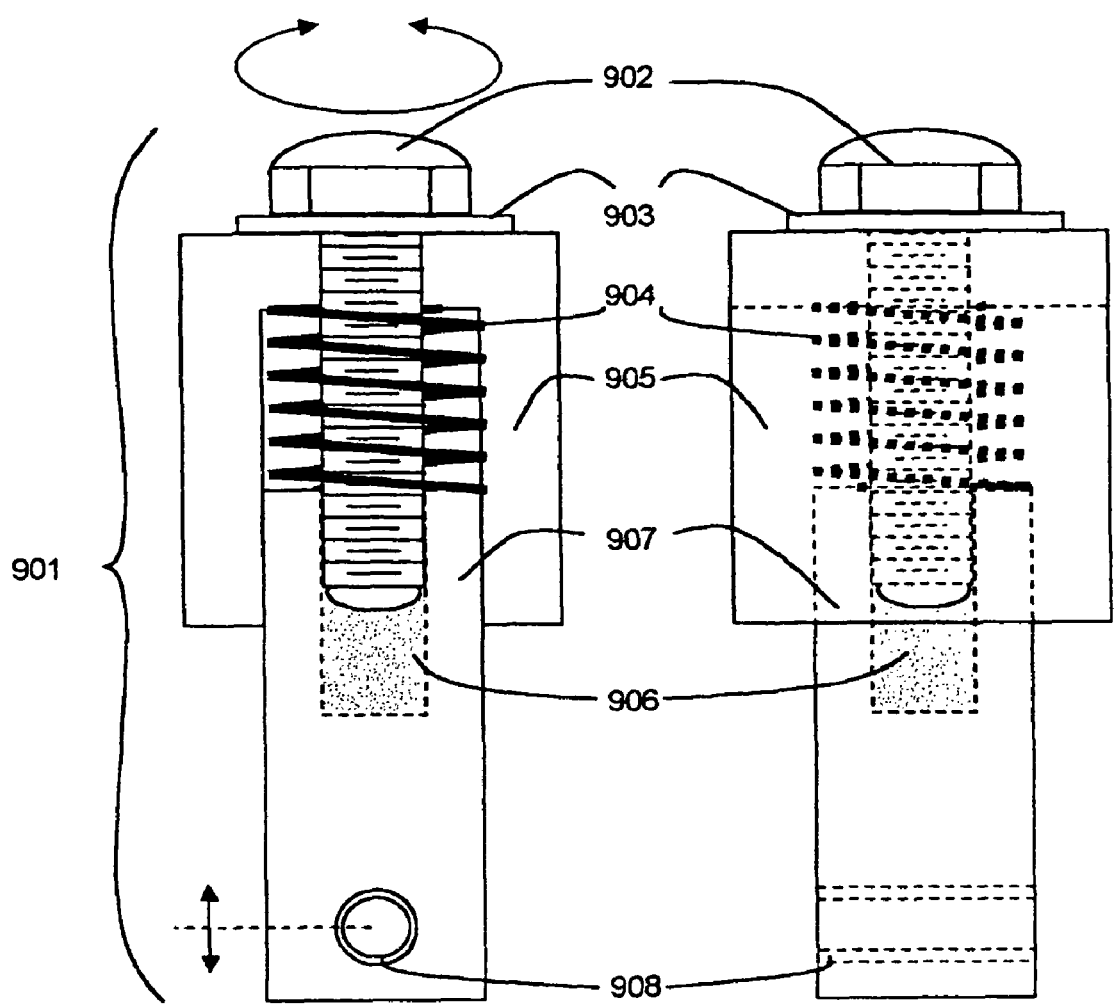
FIG. 15 shows details of the pivot adjusting mechanism used in FIG. 14.

FIG. 15 shows details of the adjusting assembly 901 used in the EDA of FIG. 14. Jackscrew 902 inserts through a washer/thrust bearing 903, through a hole in bracket 905, through the coils of spring 904, and into tapped hole 906 in one end of slider 907. Slider 907 is constrained to linear movement by the gussets of bracket 905. The opposite end of the slider 907 has a hole drilled through it fitted with a bushing 908 in order to accept a clevis pin. Longitudinal position of the slider 907 is adjusted by rotational position of the jackscrew 902. Lockwire or other locking device can be used to prevent inadvertent rotation of jackscrew 902.

Figure 16:
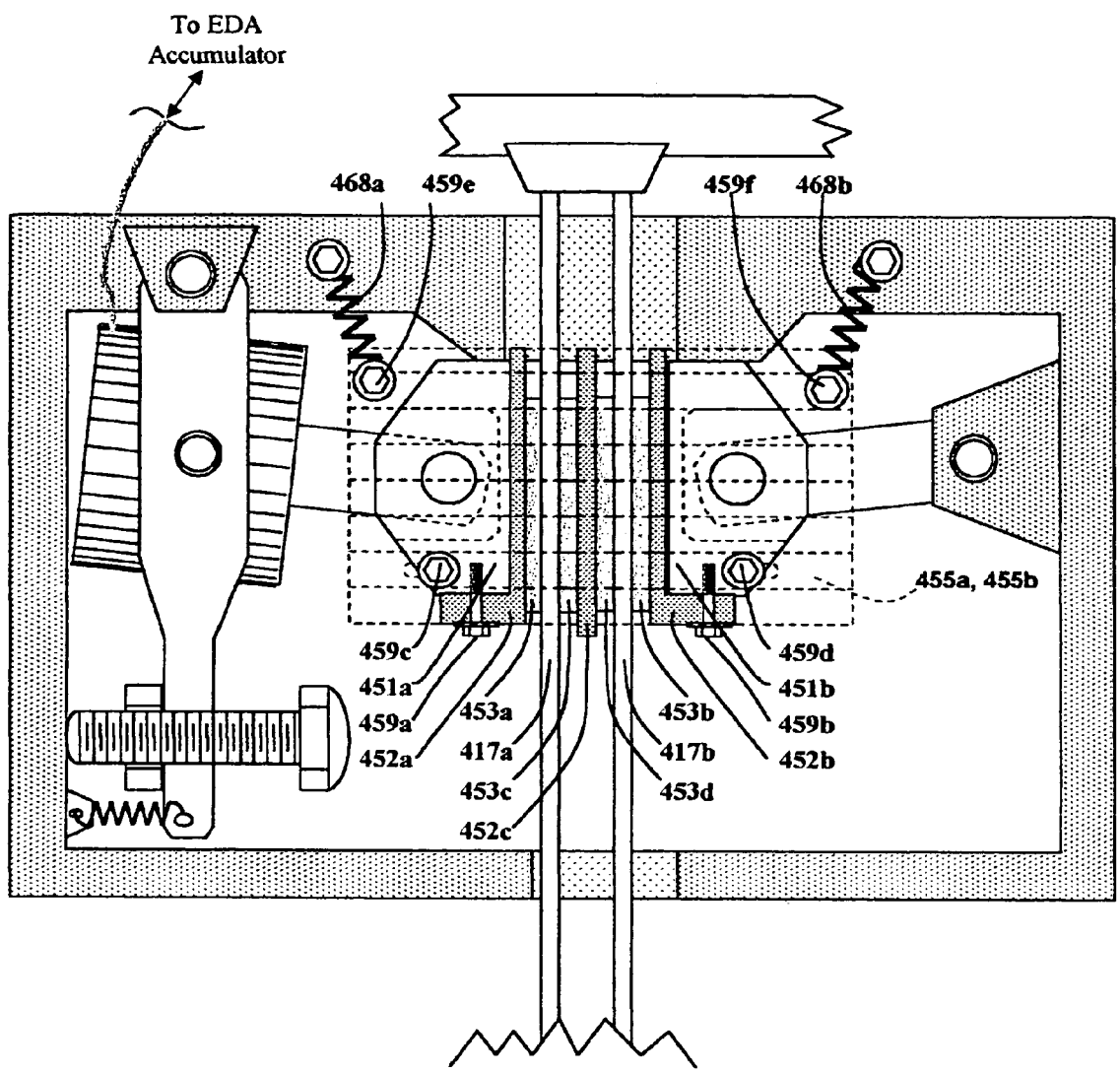
FIG. 16 shows how the required clamping force in a Check-Clamp type EDA can be reduced by adding additional suspension bars and associated brake components.

FIG. 16 shows a way of decreasing the required clamping force of a Check-Clamp type EDA while maintaining its resisting force. In this example, the required clamping force is halved as compared to one of the EDA's previously discussed. A second suspension bar 417b has been added, along with a third brake shoe 452c which has brake lining material 453c and 453d bonded to either side of it. A pair of teeth plates 455a and 455b, have ridges which engage with ridges on the sides of brake shoes 452a, 452b, and 452c to hold them aligned with one another. The teeth plates 455a and 455b are capable of transmitting shear loads developed in the center brake shoe 452c to the other brake shoes and also to the EDA framework 450. The arrangement substantially shares the total resistive force of the EDA equally among the four brake linings 453a, 453b, 453c, and 453d. Note that since two of the brake linings 453c and 453d are bonded to the center brake shoe 452c, brake shoe 452c takes substantially half of the total resistive force of the EDA, and the teeth plates 455a and 455b have to be designed accordingly. The teeth plates have holes and slots milled through them to accept machine screws 459a, 459b, 459c, and 459d which hold the teeth plates and brake shoes 452a, 452b, and 452c in continuous engagement, but lateral movement is unrestricted so as not to impact the engagement and disengagement of the clamping feature.

Figure 17:
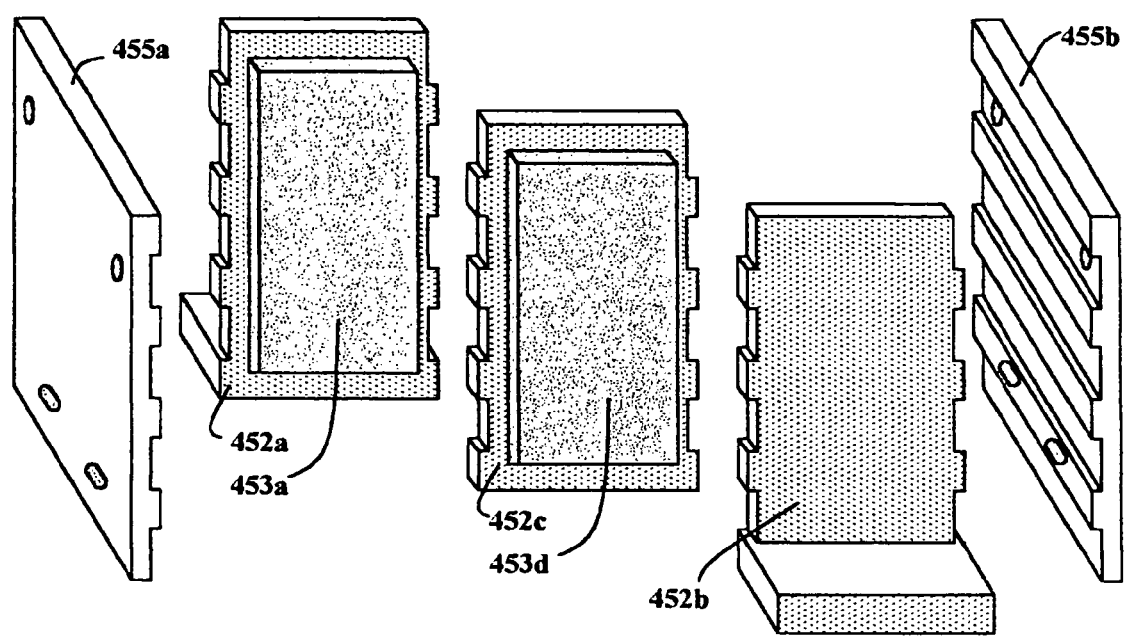
FIG. 17 shows details of some components of the multiple suspension bar Check-lamp type EDA of FIG. 16.

FIG. 17 shows selected components from FIG. 16 in an isometric view.

Additional suspension bars could be added using the method shown in FIGS. 16 and 17, interleaved with additional brake shoes, etc., as may be desired.

If a Check-Clamp type EDA is to be used in a pushing motion, as was described in FIGS. 9 and 10, additional push bars may be added in a similar method to that shown in FIGS. 16 and 17.

Figure 18:
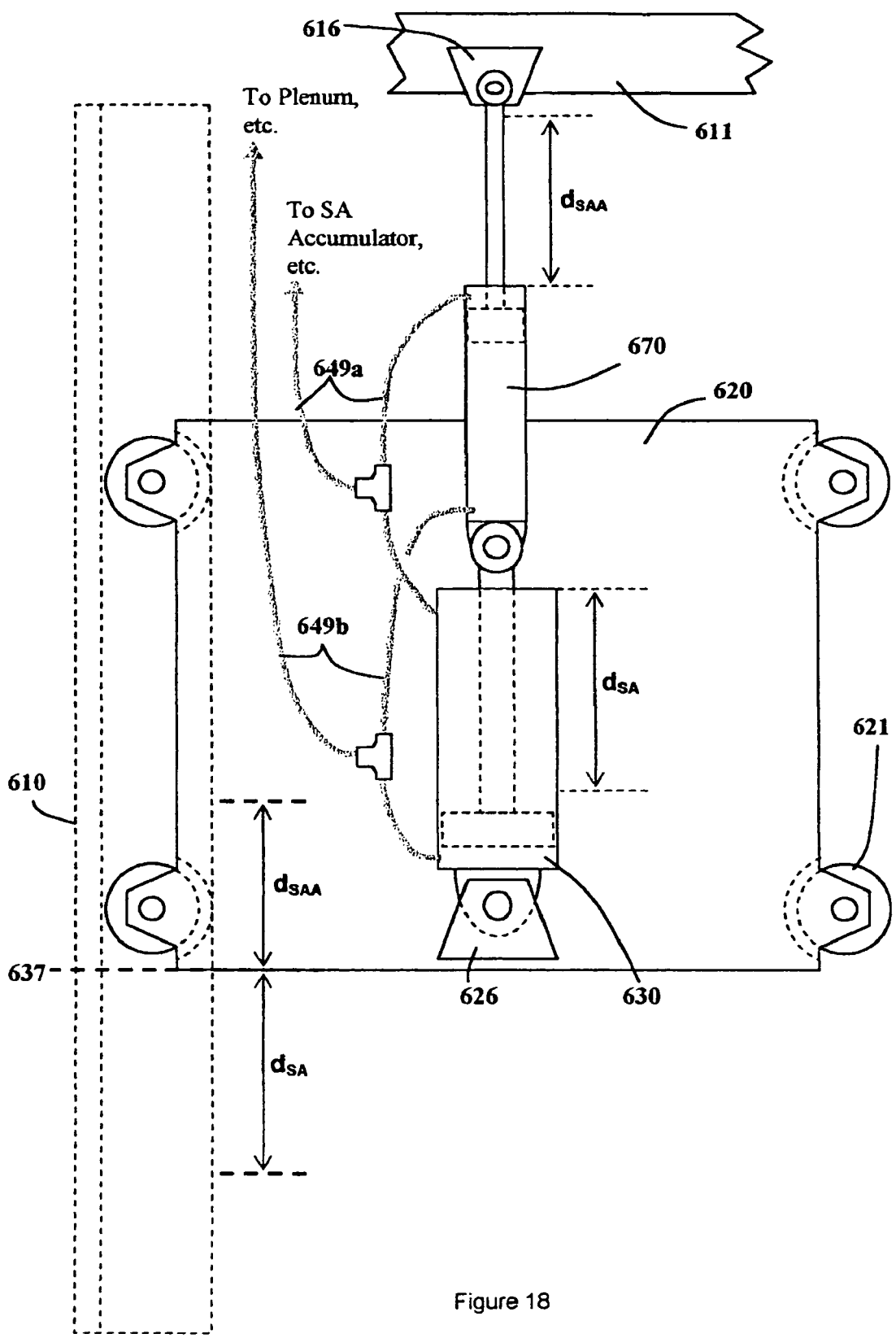
FIG. 18 shows a simple SAA arrangement.

FIG. 18 shows a simple arrangement for a type of SAA usable when the primary shock direction imposed on the vehicle is oriented vertically upward. The upper end of the SAA actuator 670 is attached to the FA crosshead 611 at clevis bracket 616. The tower end is attached to the upper end of the SA actuator 630. The lower end of the SA actuator 630 is attached to the Payload Pan 620 at clevis bracket 626. The head-end chambers of the SAA actuator 670 and the SA actuator 630 are pneumatically connected to one another and to the SA accumulator (not shown) and associated IMCP (not shown) piping by hosing 649a and are thus at the same pressure. The cap end chambers of the SAA actuator 670 and the SA actuator 630 are pneumatically connected to one another and to the plenum (not shown) and associated IMCP piping (not shown) by hosing 649a and are thus at the same pressure. The SAA actuator 670 and the SA actuator 630 apply an upward force on the Payload Pan according to the pressure in the SA accumulator and their respective piston areas. The piston area of the SAA actuator 670 is set to about three to six times the piston area of the SA Actuator 630, depending upon the application. The upward force from the SAA actuator 670 should be weak enough that the Payload Pan 620 remains at the Neutral Position 637 unless the vehicle experiences significant negative acceleration, such as becoming airborne. This is to prevent nuisance rising of the Payload Pan 620 when traversing bumpy seas or terrain that are not severe enough to require additional relative displacement to absorb the shock. The stroke of the SAA actuator 670 is $d_{SAA}$ and may be established independently of the stroke length $d_{SA}$ of the SA actuator 630.

Numerous other embodiments of the SAA actuator are conceived, many of which are similar on concept to the suspension concepts usable for the SA. When an SAA is used, it is usually easiest and simplest to incorporate the SA and EDA in SA/EDA Method 1.

The Check-Clamp type EDA can have a variable controllable force by using a solenoid to apply the clamping force. The force can be controlled by adjusting the solenoid voltage, in response to a G-sensor mounted on the FA.

The invention claimed is:

1. A limiting interface for supporting a payload relative to a structure, the limiting interface comprising:
    a frame assembly attachable to the structure;
    a payload interface assembly for receiving the payload;
    a suspension assembly disposed between the frame assembly and the payload interface assembly; and
    an energy dissipating assembly disposed between the frame assembly and the payload interface assembly and adapted to dissipate energy transmitted to the structure, so as to limit a parameter of interest transmitted to the payload, wherein a force-displacement profile of the payload interface assembly is substantially a square wave.

2. The invention according to claim 1, wherein the parameter of interest is selected from the group consisting of displacement, velocity, acceleration, jerk, vibration, force, energy, and shock.

3. A limiting interface for supporting a payload relative to a structure, the limiting interface comprising:
    a frame assembly attachable to the structure;
    a payload interface assembly for receiving the payload;
    a suspension assembly disposed between the frame assembly and the payload interface assembly;
    an energy dissipating assembly disposed between the frame assembly and the payload interface assembly and adapted to dissipate energy transmitted to the structure, so as to limit a parameter of interest transmitted to the payload; and
    an anticipating assembly disposed between the frame assembly and the payload interface assembly that repositions the payload interface assembly relative to the structure from a neutral position in anticipation of an event.

4. The invention according to claim 3, wherein the anticipating assembly increases a range of travel of the payload interface assembly relative to the structure in anticipation of an event.

5. The invention according to claim 1, wherein the suspension assembly permits relative movement between the payload interface assembly and the structure in a first direction only when acceleration transmitted to the payload is about to exceed a predetermined value.

6. The invention according to claim 1, wherein the suspension assembly permits relative movement between the payload interface assembly and the structure in a first direction only for as long as acceleration transmitted to the payload is about to exceed a predetermined value.

7. The invention according to claim 1, wherein the limiting interface is adjustable, to accommodate payload mass.

8. The invention according to claim 1, wherein the energy dissipating assembly is capable of accommodating a plurality of events.

9. The invention according to claim 8, wherein after an event, the payload interface assembly is returned to a neutral position by the suspension assembly.

10. The invention according to claim 1, wherein the energy dissipating assembly converts kinetic energy transmitted to the structure into thermal energy.

11. The invention according to claim 10, wherein the energy dissipating assembly comprises a friction brake.

12. The invention according to claim 1, wherein the payload is a person and the payload interface assembly comprises a seat.

13. The invention according to claim 1, further comprising the structure, wherein the structure comprises a vehicle.

14. A method for supporting a payload relative to a structure, the method comprising the steps of
    providing a limiting interface attached to the structure and comprising:
        a frame assembly comprising a first rail and a second rail;
        a payload interface assembly adapted to receive the payload and travel along the first rail and the second rail; and
        a suspension assembly disposed between the frame assembly and the payload interface assembly, wherein the suspension assembly comprises:
            a first actuator having at least one end mounted along the first rail; and
            a second actuator having at least one end mounted along the second rail; and
    dissipating energy transmitted to the structure along a predetermined force-displacement profile, so as to limit a parameter of interest transmitted to the payload, wherein the predetermined force-displacement profile comprises substantially a square wave force-displacement profile, wherein a magnitude of the square wave force-displacement profile is substantially constant, and wherein the magnitude of the square wave force-displacement profile is less than a predetermined value.

15. The method according to claim 14, wherein each actuator has a remaining end mounted to the payload interface assembly and wherein the second actuator is mounted as a mirror image of the first actuator.

16. The invention according to claim 11, wherein the friction brake comprises:
 a brake material; and
 at least two separate adjacent structures, each coupled to at least one of the frame assembly and the payload interface assembly, and against which the brake material is biased.

17. The invention according to claim 11, wherein the friction brake comprises:
 a brake material: and
 means for biasing the brake material against adjacent structure coupled to at least one of the frame assembly and the payload interface assembly, wherein the biasing means is disposed at an angle relative to a direction of travel of the payload interface assembly.

18. The invention according to claim 17, wherein the biasing means comprises:
 a pressure pad comprising a bearing surface disposed at the angle; and
 a bearing in contact with the bearing surface.

19. The invention according to claim 3, further comprising means for controlling the energy dissipating assembly.

20. The invention according to claim 1, wherein:
 the frame assembly comprises a first rail and a second rail;
 the payload interface is adapted to travel along the first rail and the second rail; and
 the suspension assembly comprises:
  a first actuator having one end mounted along the first rail and a remaining end mounted to the payload interface assembly; and
  a second actuator having one end mounted along the second rail and a remaining end mounted to the payload interface assembly; wherein the second actuator is mounted as a mirror image of the first actuator.

* * * * *